United States Patent
Fujikawa

(10) Patent No.: US 11,585,702 B2
(45) Date of Patent: Feb. 21, 2023

(54) TEMPERATURE DETECTION DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/541,874

(22) Filed: Dec. 3, 2021

(65) Prior Publication Data

US 2022/0178765 A1 Jun. 9, 2022

(30) Foreign Application Priority Data

Dec. 4, 2020 (JP) .............................. JP2020-201860

(51) Int. Cl.
*G01K 7/00* (2006.01)
*G02F 1/133* (2006.01)
*G02F 1/1333* (2006.01)

(52) U.S. Cl.
CPC ........... *G01K 7/00* (2013.01); *G02F 1/13306* (2013.01); *G02F 1/133382* (2013.01)

(58) Field of Classification Search
CPC ... G01K 7/00; G01K 7/01; G01K 7/16; G02F 1/13306; G02F 1/133382; G02F 1/1333; Y02E 60/10; G09F 9/30; H05K 7/20954; H05K 7/20972
See application file for complete search history.

(56) References Cited

U.S. PATENT DOCUMENTS 6,333,728 B1 * 12/2001 Libsch .............. G02F 1/133382
345/87
2018/0283964 A1 * 10/2018 Turullols ................ G01K 7/01

FOREIGN PATENT DOCUMENTS

JP     H08-029265 A     2/1996
JP     2009-236536 A    10/2009
JP     2014-039220 A     2/2014

* cited by examiner

*Primary Examiner* — Donald L Raleigh
(74) *Attorney, Agent, or Firm* — Oliff PLC

(57) ABSTRACT

A temperature detection device includes: a temperature detection element; a constant current circuit configured to supply a driving current to the temperature detection element; and a temperature signal generation unit configured to convert a voltage of the temperature detection element when the driving current is supplied to the temperature detection element into a temperature signal. The temperature detection device includes a driving current monitoring circuit configured to monitor change in the driving current outputted from the constant current circuit. The driving current monitoring circuit includes a current-voltage conversion unit voltage of which changes corresponding to a change in the driving current, and outputs by a switching circuit the voltage when the driving current is supplied from the constant current circuit to the current-voltage conversion unit.

16 Claims, 10 Drawing Sheets

TEMPERATURE DETECTION DEVICE AND ELECTRONIC APPARATUS

The present application is based on, and claims priority from JP Application Serial Number 2020-201860, filed Dec. 4, 2020, the disclosure of which is hereby incorporated by reference herein in its entirety.

BACKGROUND

1. Technical Field

The present disclosure relates to a temperature detection device including a constant current circuit configured to supply a driving current to a temperature detection element, and an electronic apparatus.

2. Related Art

In electro-optical devices such as liquid crystal devices and organic electroluminescent display devices, the temperature of electro-optical devices rises when an image is displayed. Among electro-optical devices, particularly in liquid crystal devices used as light bulbs in projection-type display devices, the temperature of liquid crystal panels is prone to rise because liquid crystal panels are irradiated with high-intensity illumination light. In such cases, modulation characteristics and response characteristics of the liquid crystal layer change. Therefore, controlling projection-type display devices based on the result obtained by detecting the temperature of liquid crystal panels allows the impact of temperature on images to be mitigated. For example, controlling a cooling fan provided in projection-type display devices based on the result obtained by detecting the temperature of liquid crystal panels allows the impact of temperature on images to be mitigated.

On the other hand, for temperature detection devices, JP-A-8-29265 discloses a configuration in which a diode serving as a temperature detection element and a constant current circuit are used. JP-A-2009-236536 discloses a configuration in which a resistor element serving as a temperature detection element and a constant voltage circuit are used.

JP-A-8-29265 discloses no configuration as to monitoring of the driving current from the constant current circuit. Therefore, non-negligible aging fluctuation or failure in the driving current will make appropriate temperature detection impossible. While it is possible to a certain extent to monitor the driving current at the very diode that serves as a temperature detection element, that is not realistic because the diode needs to be placed in a fixed temperature environment when monitoring the driving current. Moreover, diodes are nonlinear elements whose change in the forward voltage corresponding to a change in the driving current is small. Thus, diodes are unsuitable for monitoring the driving current. JP-A-2009-236536 discloses a configuration in which temperature detection is performed by a voltage division value of a resistor element serving as a temperature detection element, and failure diagnosis of the temperature detection circuit is performed using a diagnostic resistor element that has a resistance falling within the resistance value range of the temperature detection element. However, because the diagnostic resistor element has a resistance falling within the resistance value range of the temperature detection element, its sensitivity in detecting voltage fluctuation of constant voltage sources will not be greater compared to that of the temperature detection element. Even when the configuration is expanded to include driving a resistor element that is a linear element by a constant current, a change in the voltage value of the diagnostic resistor element corresponding to a change in the driving current will not be greater than a change in the voltage value of the temperature detection element. Therefore, for cases where a diode is used as a temperature detection element and driven by a constant current, there has been a demand for a configuration in which change in the driving current is highly sensitively monitored.

SUMMARY

To solve the above-described problems, a temperature detection device according to the present disclosure includes: a temperature detection element, a constant current circuit configured to supply a driving current to the temperature detection element, a voltage detection unit configured to detect a voltage of the temperature detection element when the driving current is supplied to the temperature detection element, and a driving current monitoring circuit electrically connected to the constant current circuit.

An electronic apparatus including the temperature detection device according to the present disclosure includes: an electro-optical device including an electro-optical panel whose temperature is detected via the temperature detection element.

DESCRIPTION OF EXEMPLARY EMBODIMENTS

Figure 1:
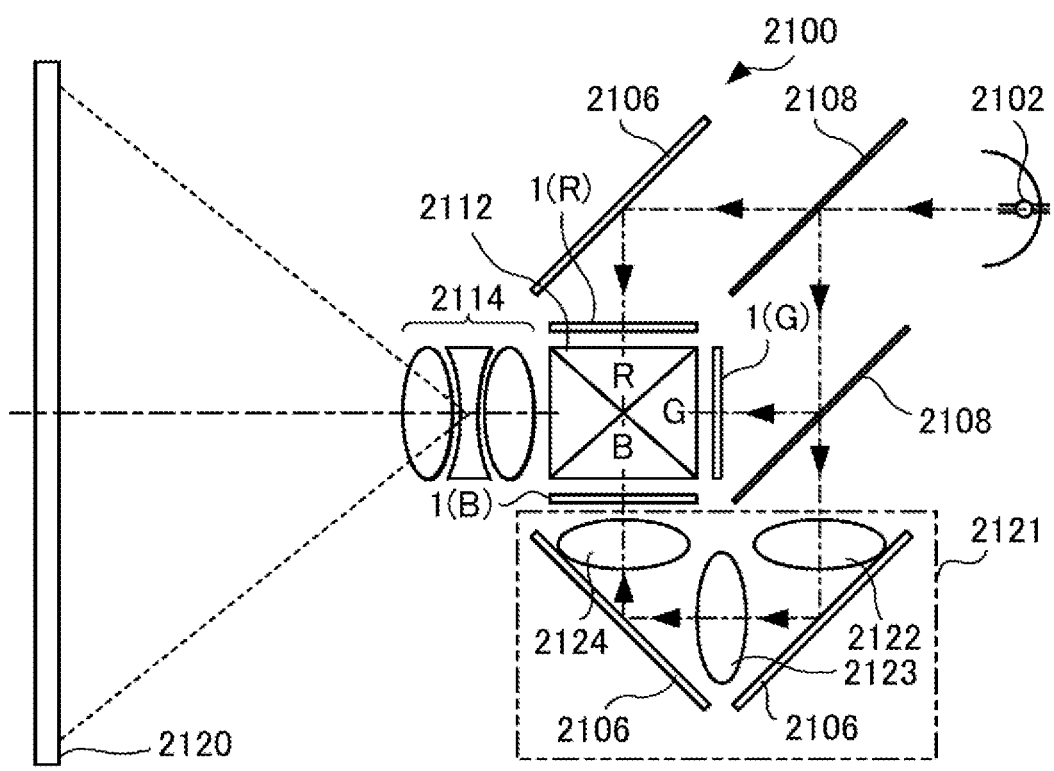
FIG. 1 is a schematic configuration diagram of an electronic apparatus to which the present disclosure is applied.

Exemplary embodiments of the present disclosure will be described below with reference to the drawings. Note that in the drawings to be referenced in the description below, to make members and the like recognizable in terms of size in the drawings, the members are illustrated in different scales and the number of members is reduced.

Exemplary Embodiment 1

1. Configuration Example of Electronic Apparatus

FIG. 1 is a schematic configuration diagram of an electronic apparatus 2100 to which the present disclosure is applied. FIG. 1 illustrates a projection-type display device as an example of the electronic apparatus 2100 to which the present disclosure is applied. Note that in FIG. 1, illustration of optical elements such as a polarizing plate disposed on an incident side or an emitting side of an electro-optical device 1 is omitted.

In FIG. 1, the electronic apparatus 2100 is a projection-type display device, and a lamp unit 2102 with a white light source such as a halogen lamp is provided as a light source unit. Projection light emitted from the lamp unit 2102 is split into three primary colors of red color R, green color G, and blue color B by three mirrors 2106 and two dichroic mirrors 2108 disposed inside. The split light is guided to electro-optical devices 1(R), 1(G), and 1(B) corresponding to each color, respectively. All of the electro-optical devices 1(R), 1(G), and 1(B) are liquid crystal devices. Note that since the light of the blue color B has a long optical path compared to the other light of the red color R and the green color G, the light of the blue color B is guided via a relay lens system 2121 including an incidence lens 2122, a relay lens 2123, and an emission lens 2124 to prevent a loss due to the long optical path of the light of the blue color B.

In the electronic apparatus 2100, image signals specifying the gray scale level for each color are each supplied from an outside higher-level device to the electronic apparatus 2100, and thereafter processed in a processing circuit in the electronic apparatus 2100 and supplied to the electro-optical devices 1(R), 1(G), and 1(B). Furthermore, the electro-optical devices 1(R), 1(G), and 1(B) modulate incident light based on image signals. The modulated light emitted from the electro-optical devices 1(R), 1(G), and 1(B) is incident on a dichroic prism 2112 from three directions. At the dichroic prism 2112, the light of the red color R and the light of the blue color B are reflected at 90 degrees, and the light of the green color G is transmitted. Therefore, the modulated light of the respective colors is synthesized at the dichroic prism 2112, and thereafter projected onto a projection target member such as a screen 2120 by a projection optical system 2114. Note that the projection-type display apparatus may be configured to use an LED light source and the like that emits light of each color as a light source unit and supply the colored light emitted from such an LED light source and the like to the electro-optical devices 1(R), 1(G), and 1(B), respectively.

2. Basic Configuration of Electro-optical Panel 100

Figure 2:
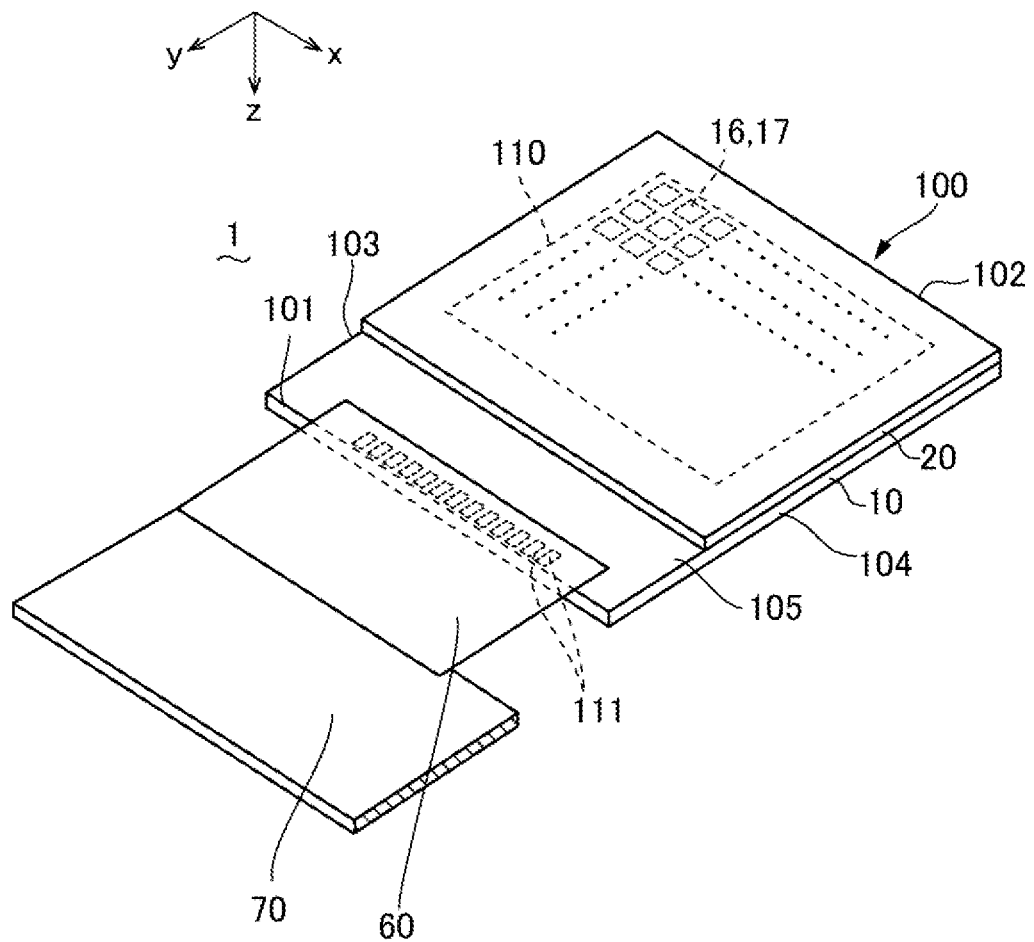
FIG. 2 is an explanatory diagram illustrating one aspect of an electro-optical panel of an electro-optical device illustrated in FIG. 1.

FIG. 2 is an explanatory diagram illustrating one aspect of an electro-optical panel 100 of an electro-optical device 1 illustrated in FIG. 1. In FIG. 2, an orthogonal coordinate system composed of an x-axis, y-axis, and z-axis is used to represent the respective directions. The z-axis direction is the thickness direction of the electro-optical panel 100; the y-axis direction is the extending direction of a wiring substrate included in the electro-optical device 1; and the x-axis direction is the width direction orthogonal to the extending direction of the wiring substrate. Note that since all of the electro-optical devices 1(R), 1(G), and 1(B) illustrated in FIG. 1 have the same structure, in the description below, in cases where there is no need to differentiate the electro-optical devices 1(R), 1(G), and 1(B) from one another, suffixes (R), (G), and (B) that stand for the corresponding colors is omitted.

In FIG. 2, the electro-optical device 1 is a liquid crystal device and includes a liquid crystal panel as the electro-optical panel 100. The electro-optical device 1 includes a plurality of pixel electrodes 16 formed in a first substrate 10, a common electrode (not illustrated) formed in a second substrate 20, and an electro-optical layer (not illustrated) that is provided between the pixel electrodes 16 and the common electrode and that is constituted by a liquid crystal layer. The pixel electrodes 16 face the common electrode via the electro-optical layer and thereby constitute a pixel 17. In the electro-optical device 1, the second substrate 20 is bonded to the first substrate 10 by a seal material (not illustrated). In the electro-optical device 1, the electro-optical layer is provided in a region surrounded by the seal material. In the electro-optical panel 100, a region in which pixels 17 are arranged in the x-axis direction and the y-axis direction represents a display region 110.

The electro-optical device 1 according to the present embodiment is a transmission-type liquid crystal device. Therefore, the substrate main body of the first substrate 10 and the substrate main body of the second substrate 20 are constituted by a light-transmissive substrate such as a heat-resistant glass and a quartz substrate. In a transmission-type electro-optical device 1, for example, illumination light incident from one substrate of the first substrate 10 and the second substrate 20 is modulated before being emitted from the side of the other substrate, and emitted as display light. In the present embodiment, illumination light incident from the second substrate 20 is modulated before being emitted from first substrate 10, and emitted as display light.

The first substrate 10 includes a protruding portion 105 that protrudes from an end of the second substrate 20 in the y-axis direction. In the protruding portion 105, a terminal region is provided in which a plurality of terminals 111 are arranged at a predetermined interval along a first side 101 extending in the x-axis direction that is the width direction of the first substrate 10. The electro-optical device 1 includes a flexible wiring substrate 60 connected to the terminals 111. The wiring substrate 60 extends away from the first substrate 10 in the y-axis direction.

As will be described below with reference to FIG. 3, when constituting the electronic apparatus 2100 illustrated in FIG. 1, electro-optical devices 1 illustrated in FIG. 2 are installed as the electro-optical devices 1(R), 1(G), and 1(B), respectively. At that time, the wiring substrates 60 for the three electro-optical devices 1(R), 1(G), and 1(B) are electrically connected to a common wiring substrate 70, respectively.

3. Configuration of Electro-optical Device 1

Figure 3:
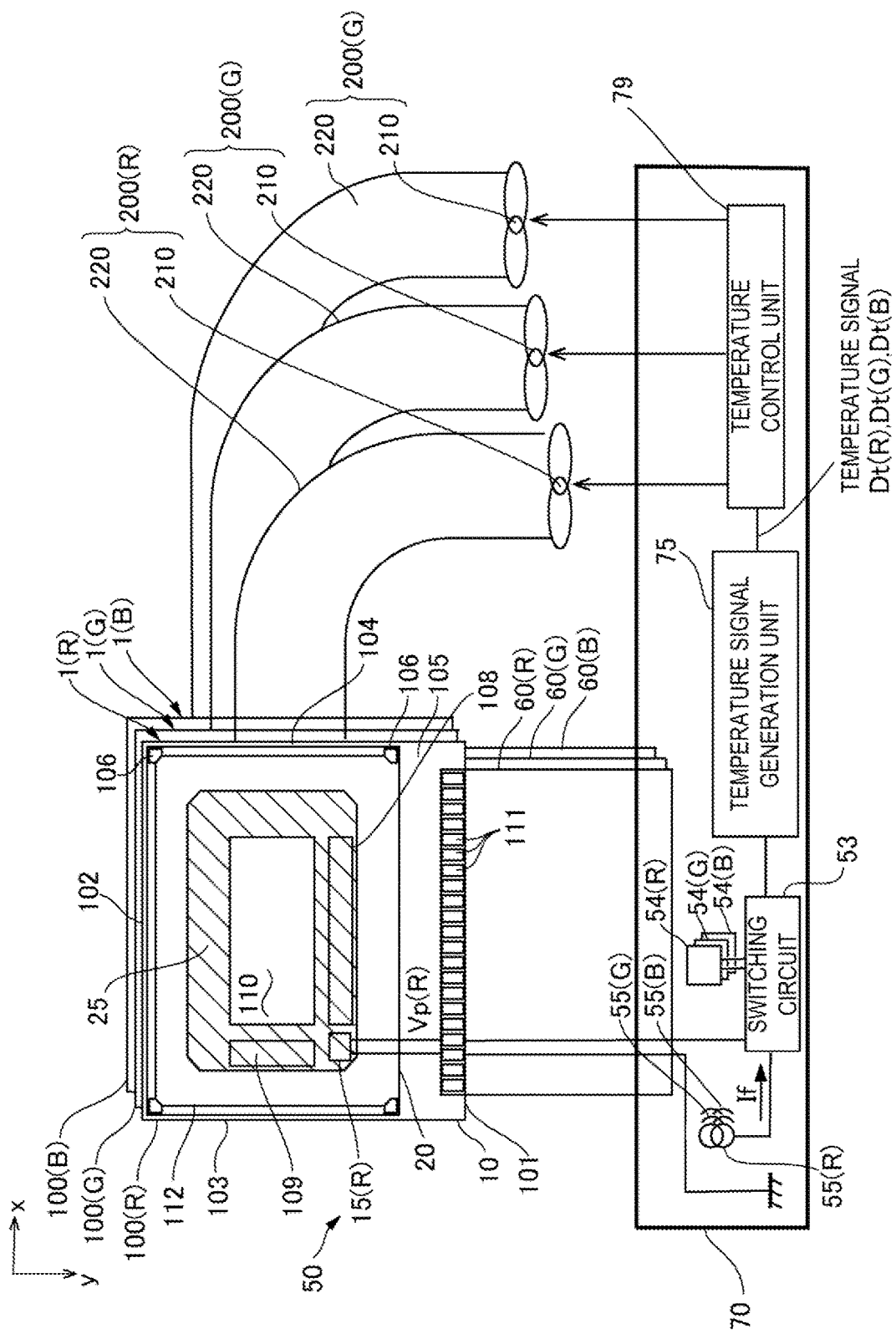
FIG. 3 is an explanatory diagram of a temperature detection device and the like provided in the electronic apparatus illustrated in FIG. 1.

FIG. 3 is an explanatory diagram of a temperature detection device 50 and the like provided in an electronic apparatus 2100 illustrated in FIG. 1. Note that the temperature detection device 50 according to the present embodiment detects the temperature of each of electro-optical panels 100(R), 100(G), and 100(B) of a plurality of electro-optical devices 1(R), 1(G), and 1(B). Therefore, among the components of the temperature detection device 50, components provided in each of the electro-optical devices 1(R), 1(G), and 1(B) have a reference sign followed by a suffix (R), (G), or (B) that stands for the corresponding color, while components common to the electro-optical devices 1(R), 1(G), and 1(B) have a reference sign not followed by any suffix (R), (G), or (B) that stands for the corresponding color. In addition, since all of the electro-optical devices 1(R), 1(G), and 1(B) have the same structure, in the description below, the electro-optical device 1(R) will be mainly described, with detailed description for the electro-optical devices 1(G) and 1(B) being omitted. However, even when describing the electro-optical device 1(R), in cases where there is no need to differentiate the electro-optical devices 1(R), 1(G), and 1(B) from one another, the suffixes (R), (G), and (B) that stand for the corresponding colors is omitted.

As illustrated in FIG. 3, in the electro-optical panel 100(R), the second substrate 20 has a frame-shaped light-shielding portion 25 formed therein, with the inside of the light shielding portion 25 serving as the display region 110. A plurality of inter-substrate conduction portions 106 are provided at positions of the first substrate 10 that overlap corners of the second substrate 20. The inter-substrate conduction portions 106 are electrically connected with each other by wiring 112, and are electrically connected to any one of the terminals 111 by wiring that is omitted from illustration. Therefore, a common voltage LCCOM is supplied from the first substrate 10 side to the common electrode of the second substrate 20 via the inter-substrate conduction portions 106.

In the first substrate 10, a data line driving circuit 108 is provided on the protruding portion 105 side of the display region 110. The data line driving circuit 108 supplies image signals to the plurality of the pixel electrodes 16 illustrated in FIG. 2 via data lines (not illustrated) and pixel switching elements (not illustrated). Each of the pixels 17 illustrated in FIG. 2 includes an auxiliary capacitance (not illustrated), which typically has one electrode electrically connected to a pixel electrode 16 and the other electrode electrically connected to the common voltage LCCOM. In the first substrate 10, an inspection circuit (not illustrated) may be provided between a second side 102 facing the first side 101 and the display region 110. In the first substrate 10, a third side 103 and a fourth side 104 extend from both ends of the first side 101 in the y-axis direction; and a scanning line driving circuit 109 is provided between the third side 103 and the display region 110. The scanning line driving circuit 109 supplies scanning signals to the pixel switching elements via scanning lines (not illustrated). The scanning line driving circuit 109 may also be provided both between the third side 103 and the display region 110 and between the fourth side 104 and the display region 110. In the present embodiment, the data line driving circuit 108 and the scanning line driving circuit 109 overlap the light-shielding portion 25 in plane view.

3. Basic Configuration of Temperature Detection Device 50

Figure 4:
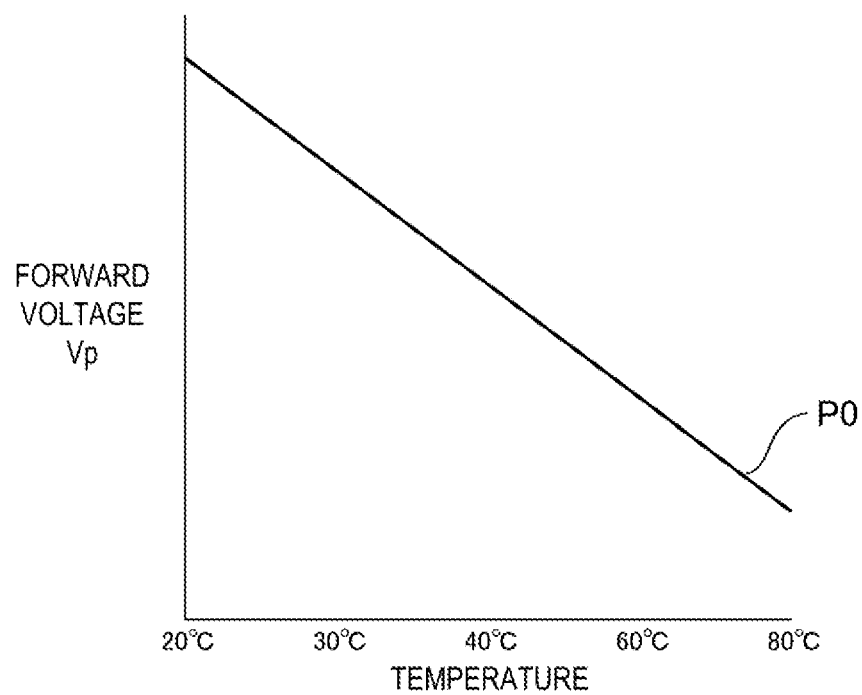
FIG. 4 is an explanatory diagram showing a temperature characteristic of a temperature detection element illustrated in FIG. 3.

FIG. 4 is an explanatory diagram showing a temperature characteristic of a temperature detection element 15 illustrated in FIG. 3. As illustrated in FIG. 3, in the electronic apparatus 2100 illustrated in FIG. 1, the temperature detection device 50 configured to detect the temperature of each of the electro-optical panels 100(R), 100(G), and 100(B) of the electro-optical devices 1(R), 1(G), and 1(B) is provided. The temperature detection device 50 includes a temperature detection element 15(R) for detecting the temperature of the electro-optical panel 100(R), a constant current circuit 55(R) configured to supply a driving current If to the temperature detection element 15(R), and a temperature signal generation unit 75 configured to generate a temperature signal Dt(R) based on an output voltage from the temperature detection element 15(R) when the driving voltage If is applied to the temperature detection element 15(R). In addition, in the electro-optical device 1(R), a temperature adjustment device 200(R) configured to adjust the temperature of the electro-optical panel 100 based on the temperature signal Dt(R) outputted from the temperature signal generation unit 75 is provided. In the present embodiment, the driving current If outputted from the constant current circuit 55(R) is supplied to the temperature detection element 15(R) at a predetermined timing by a switching circuit 53.

The temperature detection element 15(R) is provided, in the first substrate 10 of the electro-optical panel 100(R), at a position that overlaps the light-shielding portion 25 in plane view, and is close to the display region 110. Therefore, in the electro-optical panel 100(R), the temperature detection element 15(R) can detect the temperature of the electro-optical panel 100(R) in the vicinity of the display region 110.

The temperature detection element 15(R) is constituted by a diode. The constant current circuit 55(R) is electrically connected to the anode side of the diode, while the cathode side of the diode is electrically connected to ground via the wiring substrate 60. Therefore, when the driving current If is applied to the temperature detection element 15(R), the output voltage from the temperature detection element 15(R) is a forward voltage Vp(R). Such diodes are formed by utilizing a process for forming pixel switching elements and the like in the first substrate 10. In the present embodiment, the temperature detection element 15(R) is constituted by a plurality of diodes electrically connected in series to enhance detection sensitivity corresponding to change in temperature. Therefore, Vp(R)=(forward voltage per one diode)×(number of diodes), where Vp(R) is the voltage outputted from the temperature detection element 15(R). Diodes need not be of the PN junction type and may also be diode-connected transistors.

In the temperature detecting device 50 configured in this way, supplying a minute forward driving current If of about from 100 nA to several μA from the constant current circuit 55 to the temperature detection element 15(R) causes the driving current If to flow through the temperature detection element 15(R). Here, the forward voltage Vp(R) of the temperature detection element 15(R) substantially linearly changes with temperature, as shown by a solid line P0 in FIG. 4. For example, in the temperature detection element 15(R), when five diodes are connected in series, a rise in temperature by 1° C. causes the forward voltage to drop by about 10 mV. Therefore, the voltage Vp of the temperature detection element 15(R) changes with the temperature of the electro-optical panel 100(R). Accordingly, the temperature signal generation unit 75 can generate temperature signals Dt(R) based on the voltage Vp of the temperature detection element 15(R), and output the same to a temperature control unit 79. The temperature adjustment device 200(R) adjusts the temperature of the electro-optical panel 100(R) under the control of the temperature control unit 79.

For the temperature adjustment device 200(R), a mechanism for cooling the electro-optical panel 100(R) or a mechanism for heating the electro-optical panel 100(R) (not illustrated) is used. In the present embodiment, the temperature adjustment device 200(R) includes a cooling fan 210 configured to supply cooling air to the electro-optical panel 100 via a channel 220. The temperature control unit 79 controls the rotation of the cooling fan 210 of the temperature adjustment device 200(R), and controls the flow rate and the like of the cooling air supplied to the electro-optical panel 100(R). Note that in FIG. 3, for the purpose of description, illustration is made such that air is blown from the fourth side 104 side of the electro-optical panel 100(R); however, air is typically blown from the second side 102 side to the electro-optical panel 100(R). Note that in cases where a heating mechanism is employed, power supply to heater wires and the like mounted on a holder configured to hold the electro-optical panel 100(R), for example, is controlled based on control signals from the temperature control unit 79. In addition, while an independent temperature adjustment device 200 is provided for each of the electro-optical panels 100 in FIG. 3, this need not be enforced. For example, a cooling fan 210 and a channel 220 may be commonly used by the three electro-optical panels 100.

Note that with respect to the electro-optical device 1(R), the impact of temperature on images may be compensated by applying temperature correction to image signals based on control signals from a central control unit 72.

In the present embodiment, the constant current circuit 55(R), the temperature signal generation unit 75, and the temperature control unit 79 are provided in the common wiring substrate 70. Note that since the electro-optical devices 1(G) and 1(B) are each configured similarly to the electro-optical device 1(R) including the temperature detection element 15(R) and the temperature adjustment device 200(R), description thereof is omitted. Note that at least some of the functions of the constant current circuit 55(R) may be provided in a driving integrated circuit (IC) (not illustrated) implemented in the wiring substrates 60(R).

4. Configuration of Driving Current Monitoring Circuit 52 and the Like

Figure 5:
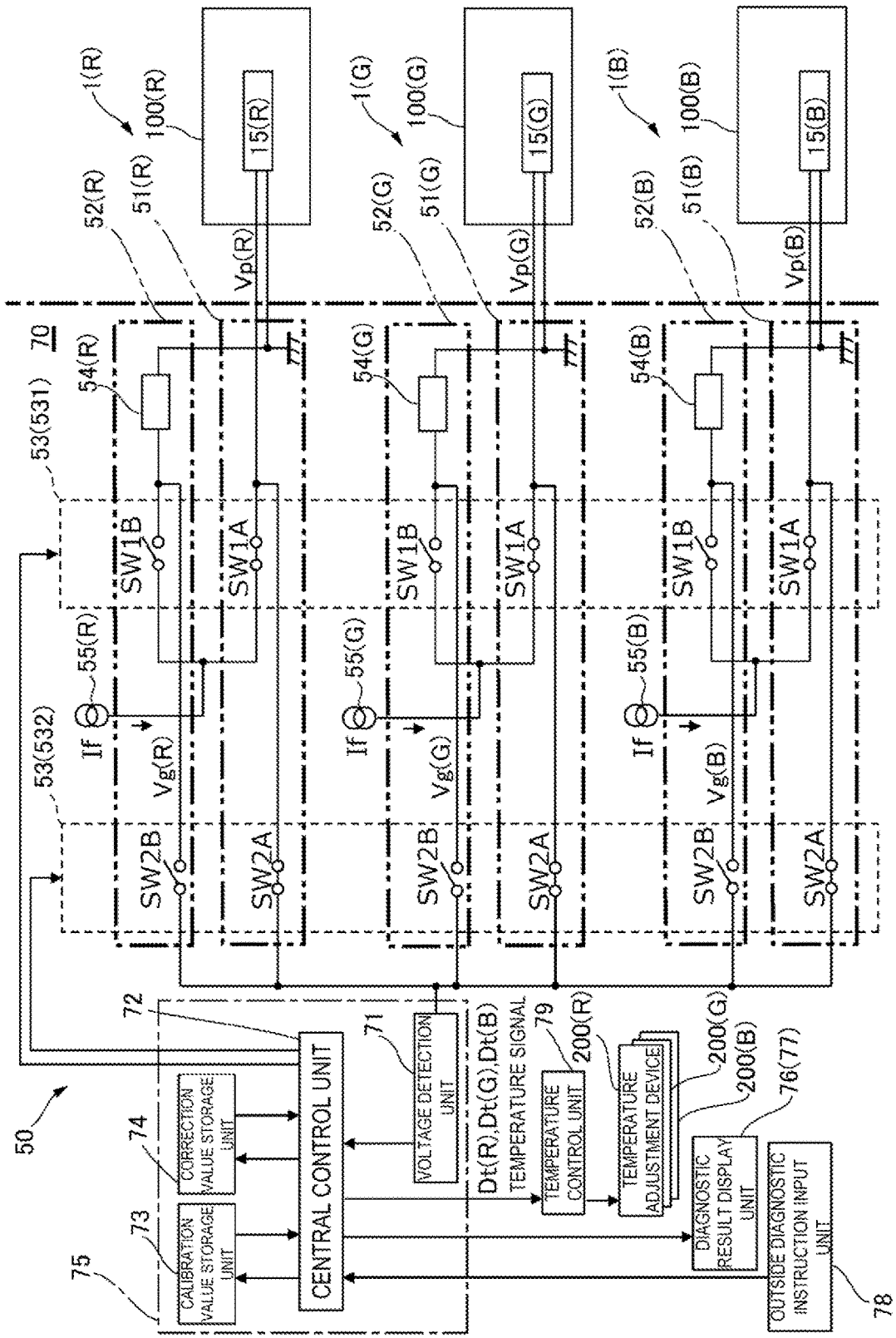
FIG. 5 is an explanatory diagram illustrating a circuit configuration of a temperature detection device according to Exemplary Embodiment 1 of the present disclosure.

FIG. 5 is an explanatory diagram illustrating a circuit configuration of a temperature detection device 50 according to Exemplary Embodiment 1 of the present disclosure. As illustrated in FIG. 5, in the temperature detection device 50 according to the present embodiment, a plurality of the constant current circuits 55(R), 55(G), and 55(B) are provided correspondingly to each of a plurality of the temperature detection elements 15(R), 15(G), and 15(B). Therefore, the driving current If generated in the constant current circuit 55(R) is supplied to the temperature detection element 15(R) provided in the electro-optical panel 100(R) via a temperature detection circuit 51(R). In contrast, the voltage Vp(R) of the temperature detection element 15(R) when the driving current If is applied, the voltage Vp(G) of the temperature detection element 15(G) when the driving current If is applied, and the voltage Vp(B) of the temperature detection element 15(B) when the driving current If is applied are all outputted to the temperature signal generation unit 75.

The temperature signal generation unit 75 includes a voltage detection unit 71 configured to detect the voltage Vp(R) of the temperature detection element 15(R), and the central control unit 72 configured to generate temperature signals Dt(R) based on the detection result at the voltage detection unit 71. The voltage detection unit 71 includes, for example, a voltage follower that uses an op-amp, and an A/D converter. The central control unit 72 performs processing such as processing for generating temperature signals Dt(R) based on a program stored beforehand in a storage unit (not illustrated) such as an electrically erasable programmable read-only memory (EEPROM).

In the present embodiment, the central control unit 72 calculates the temperature of the electro-optical panel 100(R) based on the following temperature calculation formula, and outputs a temperature signal Dt(R) corresponding to the temperature calculation result to the temperature control unit 79. Note that the coefficients A and B in the temperature calculation formula are stored in a calibration value storage unit 73 constituted by an EEPROM and the like. The voltage Vp(G) of the temperature detection element 15(G) provided in the electro-optical panel 100(G) and the voltage Vp(B) of the temperature detection element 15(B) provided in the electro-optical panel 100(B) are also similarly processed in the temperature signal generation unit 75. Since the constant current circuit 55(R) and the temperature detection element 15(R) are subject to manufacturing variation, temperature detection accuracy is improved by measuring temperature characteristics using a thermostatic chamber and the like to find calibration values. As illustrated in FIG. 4, since the voltage Vp(R) drops as the temperature rises in the case of diodes, the coefficient A typically takes a negative value.

$$\text{Temperature} = A \times \alpha(Vp(R)) + B$$

where A and B are coefficients and $\alpha(Vp(R))$ is an A/D converter value corresponding to the voltage Vp(R).

In addition, a driving current monitoring circuit 52(R) electrically connected to the constant current circuit 55(R) is provided in the temperature detection device 50. The driving current monitoring circuit 52(R) monitors change in the driving current If outputted from the constant current circuit 55(R). In the present embodiment, the driving current monitoring circuit 52(R) includes a current-voltage conversion unit 54(R) whose voltage Vg(R), which is the output voltage, changes corresponding to a change in the driving current If, and outputs the voltage Vg(R) when the driving current If is supplied to the current-voltage conversion unit 54(R). Such voltage Vg(R) is inputted to the central control unit 72 via the voltage detection unit 71. Therefore, the driving current If generated in the constant current circuit 55(R) is supplied to the temperature detection element 15(R), and is also supplied to the current-voltage conversion unit 54(R). Accordingly, in the temperature detection device 50, the switching circuit 53 configured to switch a current path between a state in which the driving current If is supplied from the constant current circuit 55(R) to the temperature detection element 15(R) and a state in which the driving current If is supplied from the constant current circuit 55(R) to the current-voltage conversion unit 54(R) is provided. The switching circuit 53 is controlled by the central control unit 72. Therefore, the central control unit 72 also controls the timing for sequentially performing the monitoring of temperature by the temperature detection elements 15(R), 15(G), and 15(B), as well as the monitoring of the driving current If by the current-voltage conversion units 54(R), 54(G), and 54(B). This timing control is executed by a program stored in an EEPROM and the like, but may be executed by an outside diagnostic instruction input unit 78. For the switching circuit 53, for example, a switching IC having a plurality of independently-controllable transfer switches built therein can be used.

In the present embodiment, the switching circuit 53 includes a first switching circuit 531 and a second switching circuit 532. The first switching circuit 531 includes a switch SW1A provided at a middle position of the wiring of the temperature detection circuit 51(R) running from the constant current circuit 55(R) to the temperature detection element 15(R), and a switch SW1B provided at a middle position of the wiring running from the constant current circuit 55(R) to the current-voltage conversion unit 54(R) in the driving current monitoring circuit 52(R). The second switching circuit 532 includes a switch SW2A provided at a middle position of an output line running from the temperature detection element 15 to the voltage detection unit 71, and a switch SW2B provided at a middle position of an output line running from the current-voltage conversion unit 54(R) to the voltage detection unit 71.

In addition, the temperature detection device 50 includes the outside diagnostic instruction input unit 78 configured to input, from the outside, diagnostic instructions for diagnosing the driving current If. The outside diagnostic instruction input unit 78 outputs commands for executing diagnosis of the driving current If to the central control unit 72. The outside diagnostic instruction input unit 78 is implemented, for example, as a control switch provided in the wiring substrate 70, a control switch provided in the electronic apparatus 2100, or a selection item on a control program menu of the electronic apparatus 2100 displayed by the electronic apparatus 2100.

5. Example of Operation

In the present embodiment, the central control unit 72 outputs, from a stand-by state in which all of the switches SW1A, SW2A, SW1B, and SW2B are turned off, and at a preset timing, a command signal for causing temperature detection to be executed to the first switching circuit 531 and the second switching circuit 532. More specifically, the central control unit 72 outputs a command signal for turning on the switches SW1A and SW2A of the temperature detection circuit 51(R) and turning off the other switches to the first switching circuit 531 and the second switching circuit 532. As a result, the driving current If is applied from the constant current circuit 55(R) to the temperature detection element 15(R) for a certain period of time, during which time the voltage Vp(R) of the temperature detection element 15(R) is inputted to the central control unit 72 via the voltage detection unit 71. Accordingly, the central control unit 72 outputs a temperature signal Dt(R) corresponding to the temperature of the electro-optical panel 100(R) to the temperature control unit 79, and temperature adjustment of the electro-optical panel 100(R) is performed by the temperature adjustment device 200(R). Such temperature detection is periodically executed during the period in which the electro-optical device 1(R) is in operation.

On the other hand, when an instruction to monitor the driving current If outputted from the constant current circuit 55(R) is inputted to the central control unit 72 via the outside diagnostic instruction input unit 78, the central control unit 72 outputs a command signal for causing the monitoring of the driving current to be executed to the first switching circuit 531 and the second switching circuit 532. More specifically, the central control unit 72 outputs a command signal for turning on the switches SW1B and SW2B of the driving current monitoring circuit 52(R) and turning off the other switches to the first switching circuit 531 and the second switching circuit 532. As a result, application of the driving current If from the constant current circuit 55(R) to the temperature detection element 15(R) is stopped, and the driving current If is applied to the current-voltage conversion unit 54(R) for a certain period of time. During that time, the voltage Vg(R) of the current-voltage conversion unit 54(R) is inputted to the central control unit 72 via the voltage detection unit 71. Setting beforehand the voltage Vg(R) when the driving current If is at the initial state allows the central control unit 72 to calculate the amount of change in the driving current If as a voltage value. The amount of change in the driving current If is a voltage value calculated by referring to the output voltage of the current-voltage conversion unit 54(R), but may be simply described as the amount of change in the driving current If in subsequent description.

Here, the central control unit 72 corrects the coefficients A and B of the aforementioned temperature calculation formula based on the amount of change in the driving current If; subsequently, the central control unit 72 calculates the temperature of the electro-optical panel 100 using the corrected coefficients A and B. More specifically, the temperature signal generation unit 75 includes a correction value storage unit 74 constituted by an EEPROM and the like. In the correction value storage unit 74, relationship between voltage values corresponding to amounts of change in the driving current If and correction values to the coefficients A and B is stored as a lookup table. For example, when the driving current decreases, the calculated temperature rises higher than the truth value; so the lookup table is prepared such that the coefficient B is decreased to cancel out the amount of rise. Note that strictly speaking, when the driving current decreases, sensitivity of the temperature detection element corresponding to temperature slightly increases, and so the coefficient A should be modified; practically speaking, however, there are cases where modification to the coefficient B alone is sufficient. Therefore, the central control unit 72 detects the amount of change in the driving current If, and thereafter corrects the coefficients A and B based on the lookup table stored in the correction value storage unit 74; subsequently, the central control unit 72 calculates the temperature of the electro-optical panel 100(R) using the corrected coefficients A and B. In this way, the temperature detection device 50 includes a correction unit configured to perform correction of the output voltage of the temperature detection element 15(R) by utilizing the correction value storage unit 74 and based on the monitoring result of the driving current If by the driving current monitoring circuit 52(R). Accordingly, even when the driving current If changes to a certain extent, the temperature of the electro-optical panel 100(R) can be properly adjusted. Consequently, in the electronic apparatus 2100 illustrated in FIG. 1, high quality images can be displayed.

In addition, the temperature detection device 50 includes an alert circuit 76 configured to report an abnormality based on the monitoring result of the driving current If by the driving current monitoring circuit 52(R), with the result being displayed in a diagnostic result display unit 77. For example, in cases where the amount of change in the driving current If deviates from a set value stored beforehand in the correction value storage unit 74 constituted by an EEPROM and the like, the central control unit 72 displays the occurrence of an abnormality on the diagnostic result display unit 77 through the alert circuit 76. The diagnostic result display unit 77 can be embodied, for example, by a light emission diode (LED) included in the wiring substrate 70 or the electronic apparatus 2100, or a display item on a maintenance program menu displayed by the electronic apparatus 2100. Therefore, turning on such an LED or displaying such a maintenance program menu allows the user to be informed of the occurrence of an abnormality in the driving current If.

Note that in the temperature detection device 50, a plurality of the temperature detection elements 15(R), 15(G), and 15(B) are provided correspondingly to a plurality of the electro-optical panels 100(R), 100(G), and 100(B). Therefore, in the temperature detection device 50, a plurality of the constant current circuits 55(R), 55(G), and 55(B), a plurality of the temperature detection circuits 51(R), 51(G), and 51(B), as well as a plurality of the driving current monitoring circuits 52(R), 52(G), and 52(B) are provided correspondingly to the plurality of the temperature detection elements 15(R), 15(G), and 15(B). In contrast, the temperature signal generation unit 75, the temperature control unit 79, the outside diagnostic instruction input unit 78, and the diagnostic result display unit 77 are common to the plurality of the electro-optical panels 100(R), 100(G), and 100(B).

Therefore, under the control of the central control unit 72 and the switching circuit 53, detection of the temperature of the plurality of the electro-optical panels 100(R), 100(G), and 100(B) is executed as follows, for example. For example, for the temperature detection circuit 51(R), a temperature measurement period of 0.5 second, during which the switch SW1A and the switch SW2A of the switching circuit 53 are turned on and the switch SW1B and the switch SW2B are turned off, is set per second. The temperature detection circuit 51(G) is also similarly controlled using switches, with its temperature measurement period starting 0.5 second after the temperature measurement period for the temperature detection circuit 51(R) ends. The temperature detection circuit 51(B) is also similarly controlled using switches, with its temperature measurement period starting 0.5 second after the temperature measurement period for the temperature detection circuit 51(G) ends. That is, repeating temperature detection cycles by the temperature detection circuits 51(R), 51(G), and 51(B) at an interval of one second allows the temperature of the electro-optical panels 100(R), 100(G), and 100(B) to be monitored. Note that temperature detection intervals and temperature measurement periods are not limited to those described above.

On the other hand, monitoring of the driving current If is carried out outside of the temperature measurement period by the temperature detection circuit 51. For example, a period of 0.5 second after the temperature measurement period for the temperature detection circuit 51(R) ends is used as the monitoring period for the driving current If of the constant current circuit 55(R). In this monitoring period, the switch SW1A and the switch SW2A of the switching circuit 53 are turned off and the switch SW1B and the switch SW2B are turned on. Similarly for the temperature detection circuit 51(G), a period of 0.5 second after the temperature measurement period ends is used as the monitoring period for the driving current If of the constant current circuit 55(G). Similarly for the temperature detection circuit 51(B), a period of 0.5 second after the temperature measurement period ends is used as the monitoring period for the driving current If of the constant current circuit 55(B). That is, repeating monitoring cycles of the driving current If by the driving current monitoring circuits 52(R), 52(G), and 52(B) at an interval of one second allows the driving current If of the constant current circuits 55(R), 55(G), and 55(B) to be monitored. Therefore, since the temperature measurement periods and the monitoring periods of the driving current If are shifted in time, temperature measurement of the electro-optical panels 100(R), 100(G), and 100(B) and monitoring of the driving current If of the constant current circuits 55(R), 55(G), and 55(B) can be compatibly performed. Note that monitoring intervals and monitoring periods for the driving current If are not limited to those described above. As long as they are shifted in time, the temperature measurement periods and the monitoring periods of the driving current If can be set as desired.

6. Configuration of Current-Voltage Conversion Unit 54

Figure 6:
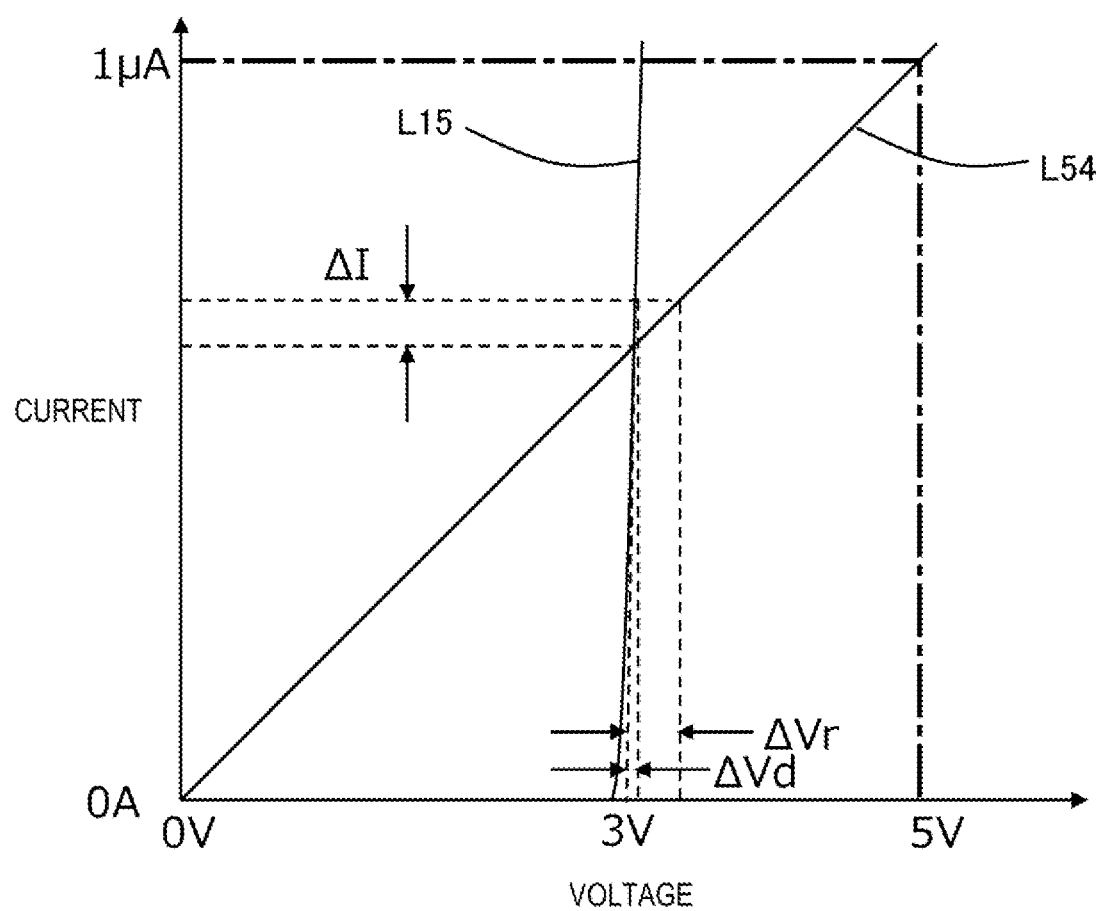
FIG. 6 is an explanatory diagram showing a current-voltage characteristic of a current-voltage conversion unit and the like illustrated in FIG. 5.

FIG. 6 is an explanatory diagram showing a current-voltage characteristic of a current-voltage conversion unit 54 and the like illustrated in FIG. 5. In FIG. 6, a current-voltage characteristic of a temperature detection element 15 is shown by a solid line L15, while a current-voltage characteristic of a current-voltage conversion unit 54 is shown by a solid line L54.

In the present embodiment, as shown in FIG. 6, when the driving current If changes by ΔI, the amount of change ΔVr in the voltage of the current-voltage conversion unit 54 is greater than the amount of change ΔVd in the voltage of the temperature detection element 15. In the present embodiment, the temperature detection element 15 is a diode, and the current-voltage conversion unit 54 is constituted by a fixed resistor. For example, the temperature detection element 15 includes five diodes connected in series, and has a nonlinear characteristic in that the current sharply increases from the vicinity of 3V; thus, even when the driving current If changes by ΔI, the amount of change ΔVd in the voltage Vp of the temperature detection element 15 is small. Therefore, it is difficult to monitor change in the driving current If from the voltage Vp when the driving current If is applied to the temperature detection element 15.

On the other hand, the current-voltage conversion unit 54 is, for example, a fixed resistor having a resistance value of 5 MΩ, and has a linear characteristic in that the current is proportional to the voltage; thus, when the driving current If changes by ΔI, the amount of change ΔVr in the voltage Vg of the current-voltage conversion unit 54 is greater than the amount of change ΔVd in the voltage Vp. To quantitatively describe the above-described features, as will be shown below, it can be stated that in the current-voltage conversion unit 54, an amount of change in the voltage corresponding to a change in the driving current If is greater than n·N·K·T/q·If. Note that in the formulae used in the description below, the content of each parameter is as described below. Values of a saturation current Is and a radiation coefficient N can be obtained, for example, by measuring electric characteristics of diodes at room temperature (300 K) and causing them to be fitted to a theoretical formula. For example, analysis tools such as a solver implemented in spreadsheet applications as typified by Excel from Microsoft Corporation and the like can be used to find the value of Is and N that will minimize a square sum of errors between the measured values and the theoretical formula.

Is: saturation current of a diode
If: driving current (forward current of the diode)
Vf: forward voltage of the diode
K: Boltzmann constant
T: temperature [K]
q: charge quantity of electrons
N: radiation coefficient
n: number of diodes in series
Vp: total forward voltage of n diodes in series First, the relationship between the forward voltage Vf and the forward current (driving current If) in a diode is shown by the following formula (1).

$$If = Is\{\exp(q \cdot Vf/N \cdot K \cdot T) - 1\} \qquad \text{formula (1)}$$

By approximating the formula (1) to the formula below and solving the latter with respect to Vf, the formula (2) is obtained.

$$If = Is\{\exp(q \cdot VF/N \cdot K \cdot T)\}$$

$$Vf = N \cdot K \cdot T/q \cdot \ln(If) - N \cdot K \cdot T/q \cdot \ln(Is) \qquad \text{formula (2)}$$

By partially differentiating the formula (2) with respect to If, the formula (3) is obtained.

$$\delta Vf/\delta If = N \cdot K \cdot T/q \cdot If \qquad \text{formula (3)}$$

When five diodes in series are used, the overall voltage Vp is given by the following formula; thus, the formula (4) is obtained.

$$Vp = n \cdot Vf = 5 \cdot Vf$$

$$\delta Vp/\delta If = 5 \cdot N \cdot K \cdot T/q \cdot If \qquad \text{formula (4)}$$

Here, when N=about 1.6 is used as the value for diodes formed by a high-temperature polysilicon process used in the manufacture of the electro-optical panel 100, and T is room temperature (=300 [K]), the formula (5) is obtained.

$$5 \cdot N \cdot K \cdot T/q \approx 0.2 \text{ [V]} \quad \text{formula (5)}$$

Therefore, assuming that the driving current If is 0.5 [µA], a change in the voltage Vp corresponding to a change in the driving current If will be as shown by the formula (6).

$$\delta Vp/\delta If = 0.2 \text{ [V]}/0.5 \text{ [µA]} = 0.4M \text{ [V/A]} \quad \text{formula (6)}$$

Accordingly, when the driving current If changes by 10% (0.05 µA), the voltage Vp fluctuates by about 20 mV. That is, in cases where the temperature detection element 15 is constituted by five diodes in series, sensitivity of the voltage Vp corresponding to change in temperature is approximately −10 mV/° C., which amounts to an error of about 2° C.

When this is rewritten as a change in voltage corresponding to a change in the driving current If in the fixed resistor, as is clear from the formula (6), the result is as shown in the formula (7).

$$R = 20 \text{ [mV]}/0.05 \text{ [µA]} = 400 \text{ [k}\Omega\text{]} \quad \text{formula (7)}$$

Therefore, assuming that the driving current is 0.5 µA, when a fixed resistor of 5 MΩ is used for the current-voltage conversion unit 54, sensitivity of change in voltage corresponding to a 10% change in the driving current If will be 10 times or more greater than that of the temperature detection element 15.

In addition, in the case of fixed resistors, aging change in the resistance value is about ±0.5%, which is extremely low. In addition, fixed resistors have a temperature dependency of several hundred ppm, which is extremely low. Considering that the fixed resistor is disposed in the wiring substrate 70 whose change in temperature is smaller than that of the electro-optical panel 100, for fluctuation in the resistance value of fixed resistors, it is sufficient that aging change is mainly taken into account. For example, in the case of a fixed resistor of 5 MΩ, aging change is about ±25 kΩ. Assuming that the driving current If is 0.5 µA, the impact of aging change in the resistance value is less than ±15 mV. A change of this scale will not greatly affect detection of the amount of change in voltage (200 mV or greater) that corresponds to a 10% change in the driving current If. Accordingly, fixed resistors are suitable for the current-voltage conversion unit 54 for detecting change in the driving current If. Therefore, since change in the driving current If can be sensitively monitored, appropriate temperature detection can be managed for the electro-optical panel 100.

Modified Example of Exemplary Embodiment 1

Figure 7:
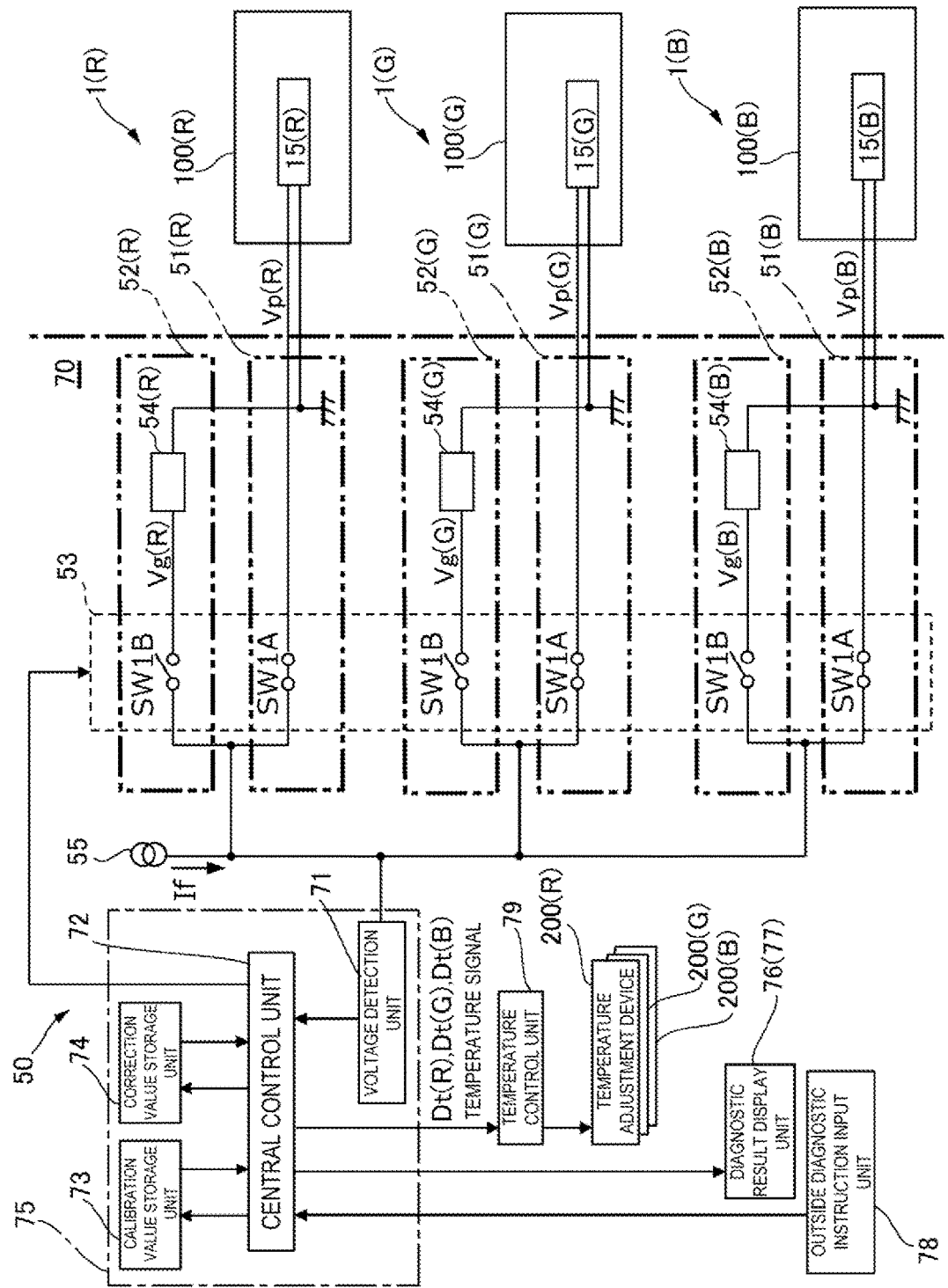
FIG. 7 is an explanatory diagram illustrating a circuit configuration of a temperature detection device according to a modified example of Exemplary Embodiment 1 of the present disclosure.

FIG. 7 is an explanatory diagram illustrating a circuit configuration of a temperature detection device 50 according to a modified example of Exemplary Embodiment 1 of the present disclosure. Note that basic configuration of the present embodiment is similar to that of Exemplary Embodiment 1; thus, common portions are denoted by the same reference signs and description thereof will be omitted.

As illustrated in FIG. 7, in the temperature detection device 50 according to the present embodiment, similarly to Exemplary Embodiment 1, the temperature detection elements 15(R), 15(G), and 15(B) are provided correspondingly to each of the electro-optical panels 100(R), 100(G), and 100(B) of the plurality of the electro-optical devices 1(R), 1(G), and 1(B). Therefore, the temperature detection circuits 51(R), 51(G), and 51(B), and the driving current monitoring circuits 52(R), 52(G), and 52(B) are provided correspondingly to each of the electro-optical panels 100(R), 100(G), and 100(B). In addition, the temperature signal generation unit 75, the temperature control unit 79, the outside diagnostic instruction input unit 78, and the diagnostic result display unit 77 are common to the three electro-optical panels 100(R), 100(G), and 100(B).

Here, the constant current circuit 55 supplies the driving current If to each of the plurality of the temperature detection elements 15 via the temperature detection circuits 51. Therefore, since the number of the constant current circuit 55 is less than the number of the temperature detection elements 15, circuit configuration can be simplified and the probability of occurrence of a malfunction caused by the constant current circuit 55 can be reduced. In addition, the driving current monitoring circuit 52 is provided correspondingly to each of the plurality of the temperature detection elements 15; and the constant current circuit 55 supplies the driving current If to each of the current-voltage conversion units 54 of the plurality of the driving current monitoring circuits 52.

In addition, the temperature detection device 50 includes the switching circuit 53 configured to switch a current path between a state in which the driving current If is supplied from the constant current circuit 55 to the temperature detection element 15 and a state in which the driving current If is supplied from the constant current circuit 55 to the current-voltage conversion unit 54. More specifically, in the temperature detection circuit 51, a switch SW1A is provided at a middle position of the wiring running from the constant current circuit 55 to the temperature detection element 15; and in the driving current monitoring circuit 52, a switch SW1B is provided at a middle position of the wiring running from the constant current circuit 55 to the current-voltage conversion unit 54.

Therefore, when observing the voltage Vp of the temperature detection circuit 51, a voltage drop due to SW1A is included; and when observing the voltage Vg of the current-voltage conversion unit 54, a voltage drop due to SW1B is included. However, since the driving current If is extremely small, and the on resistance values of the switches SW1A and SW1B are also sufficiently small, the error imparted to the voltage Vp of the temperature detection circuit 51 and the voltage Vg of the current-voltage conversion unit 54 can be made small.

Therefore, when detecting temperature, the central control unit 72 outputs a command signal for turning on the switch SW1A corresponding to the electro-optical panel 100(R) and turning off the other switches to the switching circuit 53. As a result, the driving current If is applied from the constant current circuit 55 to the temperature detection element 15(R) for a certain period of time, during which time the voltage Vp(R) of the temperature detection element 15(R) is inputted to the central control unit 72 via the voltage detection unit 71. Accordingly, the central control unit 72 can detect, based on the monitoring result at the temperature detection circuit 51(R), the temperature of the electro-optical panel 100(R). In addition, after detecting the temperature of the electro-optical panel 100(R), detection of the temperature of the electro-optical panel 100(G) and detection of the temperature of the electro-optical panel 100(B) can be sequentially performed.

In addition, when monitoring the driving current, the central control unit 72 outputs a command signal for turning on the switch SW1B corresponding to the electro-optical panel 100(R) and turning off the other switches to the switching circuit 53. As a result, application of the driving current If from the constant current circuit 55 to the temperature detection element 15(R) and the like is stopped, and the driving current If is applied to the current-voltage conversion unit 54(R) for a certain period of time. During that time, the voltage Vg(R) of the current-voltage conversion unit 54(R) is inputted to the central control unit 72 via the voltage detection unit 71. Accordingly, the central control unit 72 can calculate, based on the monitoring result at the driving current monitoring circuit 52(R), the amount of change in the driving current If. In addition, after monitoring of the driving current If at the driving current monitoring circuit 52(R), monitoring of the driving current If at the driving current monitoring circuit 52(G) and monitoring of the driving current If at the driving current monitoring circuit 52(B) can be sequentially performed.

In the present embodiment, the constant current circuit 55 is common to three temperature detection elements 15(R), 15(G), and 15(B); however, three driving current monitoring circuits 52(R), 52(G), and 52(B) are provided correspondingly to the temperature detection elements 15(R), 15(G), and 15(B). For this reason, performing monitoring using three current-voltage conversion units 54 can also eliminate erroneous determination due to abnormality of the current-voltage conversion unit 54. For example, since the constant current circuit 55 is common, when the monitoring result by one current-voltage conversion unit 54 is abnormal and the monitoring result by the remaining two current-voltage conversion units 54 is normal, then erroneous determination can be avoided by assuming that the one current-voltage conversion unit 54 has failed. Abnormality determination of the current-voltage conversion units 54 can be carried out as follows, for example. It has been described that when the driving current If is 0.5 µA, as an example of aging change in the output voltage of the current-voltage conversion units 54, a change of about ±15 mV is expected with the initial state serving as a point of reference. Therefore, for example, a determination can be performed to the effect that the current-voltage conversion unit 54 shall be deemed to have failed when a voltage fluctuation exceeding ±20 mV is detected with the initial state serving as a point of reference.

In addition, in each of the plurality of the temperature detection circuits 51 and the driving current monitoring circuits 52, the voltage Vp of the temperature detection element 15 is inputted to the voltage detection unit 71 via the switch SW1A, and the voltage Vg of the current-voltage conversion unit 54 is inputted to the voltage detection unit 71 via the switch SW1B. Thus, circuit configuration can be simplified, which includes the ability to decrease the number of switches.

In addition, compared to cases where separate constant current circuits 55 are provided, temperature measurement error among electro-optical panels 100 due to differences in the driving current If is eliminated; thus, this configuration is suitable in cases where emphasis is placed on relative temperature control among electro-optical panels 100. For example, in pixel shift driving, display coordinates are shifted by periodical rocking of optical components disposed on the emission optical path of a projector to enhance display definition. In this case, a large difference in temperature among electro-optical panels 100 can sometimes cause problems such as defective coloring. However, causing a constant current circuit 55 to be commonly used by three temperature detection elements 15(R), 15(G), and 15(B) as in the present embodiment eliminates temperature measurement error among electro-optical panels 100 due to difference in the driving current If, making temperature management easy.

Exemplary Embodiment 2

Figure 8:
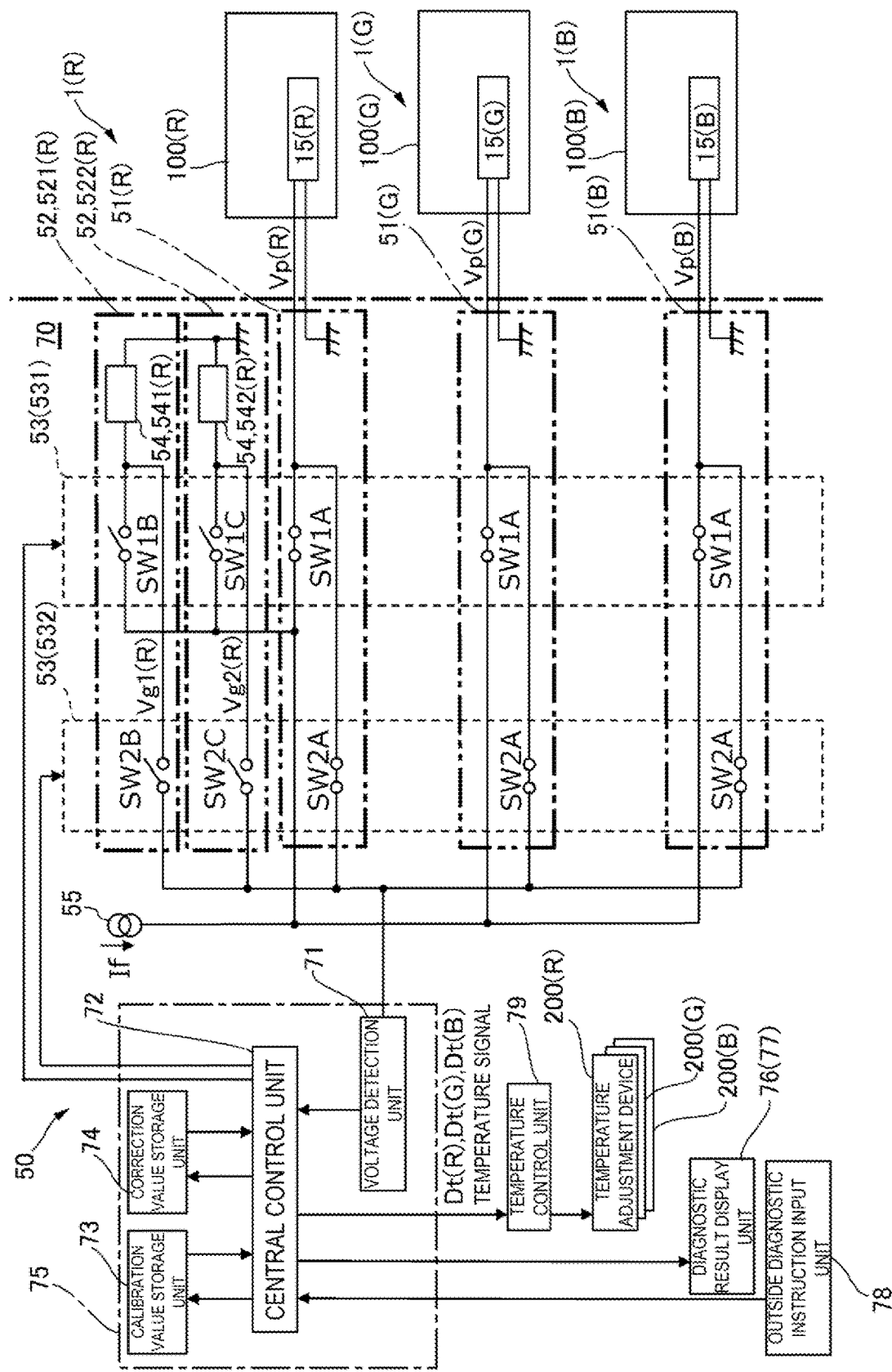
FIG. 8 is an explanatory diagram illustrating a circuit configuration of a temperature detection device according to Exemplary Embodiment 2 of the present disclosure.

FIG. 8 is an explanatory diagram illustrating a circuit configuration of a temperature detection device 50 according to Exemplary Embodiment 2 of the present disclosure. Note that basic configuration of the present embodiment is similar to that of Exemplary Embodiment 1; thus, common portions are denoted by the same reference signs and description thereof is omitted.

As illustrated in FIG. 8, in the temperature detection device 50 according to the present embodiment, similarly to Exemplary Embodiment 1, a plurality of the temperature detection elements 15(R), 15(G), and 15(B) are provided correspondingly to each of the electro-optical panels 100(R), 100(G), and 100(B) of the plurality of the electro-optical devices 1(R), 1(G), and 1(B). In addition, the temperature signal generation unit 75, the temperature control unit 79, the outside diagnostic instruction input unit 78, and the diagnostic result display unit 77 are common to the three electro-optical panels 100(R), 100(G), and 100(B).

In the present embodiment, similarly to the modified example of Exemplary Embodiment 1, the constant current circuit 55 supplies the driving current If to each of the plurality of the temperature detection elements 15 via the temperature detection circuits 51. Therefore, since the number of the constant current circuit 55 is less than the number of the temperature detection elements 15, advantages such as ability to simplify circuit configuration are obtained.

In the present embodiment, the driving current monitoring circuit 52 is provided correspondingly to any one of the plurality of the temperature detection elements 15. In addition, a plurality of the driving current monitoring circuits 52 are provided correspondingly to any one of the plurality of the temperature detection elements 15, and the constant current circuit 55 supplies the driving current If to each of a plurality of the current-voltage conversion units 54 of the driving current monitoring circuits 52. In the present embodiment, the driving current monitoring circuits 52(R) are provided, as a first driving current monitoring circuit 521(R) and a second driving current monitoring circuit 522(R), correspondingly to the temperature detection element 15(R) from among the plurality of the temperature detection elements 15(R), 15(G), and 15(B). The constant current circuit 55 sequentially supplies the driving current If to each of a first current-voltage conversion unit 541(R) of the first driving current monitoring circuit 521(R) and a second current-voltage conversion unit 542(R) of the second driving current monitoring circuit 522(R). In addition, a voltage Vg1(R) of the first current-voltage conversion unit 541(R) of the first driving current monitoring circuit 521(R) and a voltage Vg2(R) of the second current-voltage conversion unit 542(R) of the second driving current monitoring circuit 522(R) are both sequentially outputted to the common temperature signal generation unit 75.

In addition, in the first switching circuit 531 of the switching circuit 53, a switch SW1A is provided at a middle position of the wiring running from the constant current circuit 55 to the temperature detection element 15 in the temperature detection circuit 51. In addition, in the first switching circuit 531, a switch SW1B is provided at a middle position of the wiring running from the constant current circuit 55 to the first current-voltage conversion unit 541(R) in the first driving current monitoring circuit 521(R), and a switch SW1C is provided at a middle position of the wiring running from the constant current circuit 55 to the second current-voltage conversion unit 542(R) in the second driving current monitoring circuit 522(R).

In addition, in the second switching circuit 532 of the switching circuit 53, a switch SW2A is provided at a middle position of the wiring of the temperature detection circuit 51(R) running from the temperature detection element 15 to the voltage detection unit 71. In addition, in the second switching circuit 532, a switch SW2B is provided at a middle position of the wiring running from the first current-voltage conversion unit 541 to the voltage detection unit 71 in the first driving current monitoring circuit 521(R), and a switch SW2C is provided at a middle position of the wiring running from the second current-voltage conversion unit 542 to the voltage detection unit 71 in the second driving current monitoring circuit 522(R).

Therefore, when detecting temperature, the central control unit 72 outputs a command signal for turning on the switches SW1A and SW2A corresponding to the electro-optical panel 100(R) and turning off the other switches to the first switching circuit 531 and the second switching circuit 532. As a result, the driving current If is applied from the constant current circuit 55 to the temperature detection element 15(R) for a certain period of time, during which time the voltage Vp of the temperature detection element 15(R) is inputted to the central control unit 72 via the voltage detection unit 71. Accordingly, the central control unit 72 can detect, based on the monitoring result at the temperature detection circuit 51(R), the temperature of the electro-optical panel 100(R). In addition, after detection of the temperature of the electro-optical panel 100(R), detection of the temperature of the electro-optical panel 100(G) and detection of the temperature of the electro-optical panel 100(B) can be sequentially performed.

In addition, when monitoring the driving current, the central control unit 72 outputs a command signal for turning on the switches SW1B and SW2B corresponding to the electro-optical panel 100(R) and turning off the other switches to the first switching circuit 531 and the second switching circuit 532. As a result, application of the driving current If from the constant current circuit 55 to the temperature detection element 15(R) is stopped, and the driving current If is applied to the first current-voltage conversion unit 541(R) of the first driving current monitoring circuit 521(R) for a certain period of time. During that time, application of the driving current If to the second current-voltage conversion unit 542(R) of the second driving current monitoring circuit 522(R) is stopped. Accordingly, the voltage Vg1(R) of the first current-voltage conversion unit 541(R) is inputted to the central control unit 72 via the voltage detection unit 71.

Next, the central control unit 72 outputs a command signal for turning on the switches SW1C and SW2C and turning off the other switches to the first switching circuit 531 and the second switching circuit 532. As a result, with application of the driving current If from the constant current circuit 55 to the temperature detection element 15(R) kept being stopped, the driving current If is applied to the second current-voltage conversion unit 542(R) of the second driving current monitoring circuit 522(R) for a certain period of time. During that time, application of the driving current If to the first current-voltage conversion unit 541(R) of the first driving current monitoring circuit 521(R) is stopped. Accordingly, the voltage Vg2(R) of the second current-voltage conversion unit 542(R) is inputted to the central control unit 72 via the voltage detection unit 71.

Therefore, the central control unit 72 calculates, based on the voltage Vg1(R) of the first current-voltage conversion unit 541(R) and the voltage Vg2(R) of the second current-voltage conversion unit 542(R), the amount of change in the driving current If from a preset current value. For example, the central control unit 72 determines a mean value of the amount of change in the driving current If calculated based on the voltage Vg1 of the first current-voltage conversion unit 541 and the amount of change in the driving current If calculated based on the voltage Vg2 of the second current-voltage conversion unit 542 as the amount of change in the driving current If. In addition, when difference between the amount of change in the driving current If calculated based on the voltage Vg1 of the first current-voltage conversion unit 541 and the amount of change in the driving current If calculated based on the voltage Vg2 of the second current-voltage conversion unit 542 is greater than a preset value, an abnormality is reported by the alert circuit 76 such as the diagnostic result display unit 77. The rest of the configuration and operation is similar to that of Exemplary Embodiment 1, and thus description thereof is omitted.

In the present embodiment, the first current-voltage conversion unit 541 and the second current-voltage conversion unit 542 may either be fixed resistors having the same resistance value or fixed resistors having different resistance values. Here, the first current-voltage conversion unit 541 and the second current-voltage conversion unit 542 may have different resistance values. For example, the first current-voltage conversion unit 541 has a resistance value of 5 MΩ, while the second current-voltage conversion unit 542 has a resistance value of 7 MΩ. Therefore, assuming that the driving current If is 0.5 μA, an output of 2.5 V can be obtained from the first current-voltage conversion unit 541, while an output of 3.5 V can be obtained from the second current-voltage conversion unit 542. According to such configuration, in addition to the amount of change in the driving current If, stability of constant current characteristics when the operation point voltage of the constant current circuit 55 is changed can be monitored. Therefore, not only when the driving current If greatly changes but also when stability of constant current characteristics deteriorates, failure of the constant current circuit 55 can be detected, and repair and the like to the constant current circuit 55 can be performed.

Modified Example of Exemplary Embodiment 2

Figure 9:
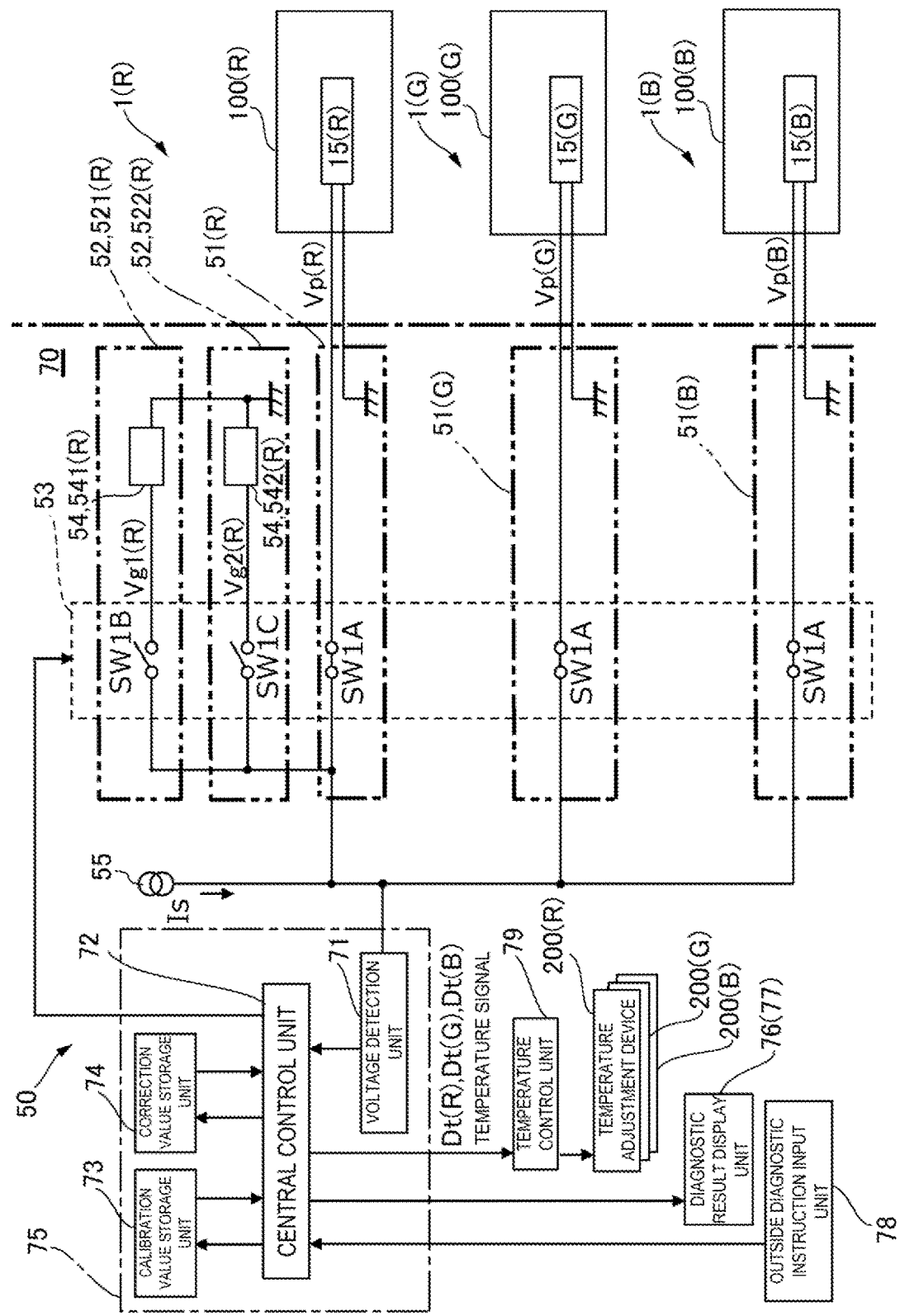
FIG. 9 is an explanatory diagram illustrating a circuit configuration of a temperature detection device according to a modified example of Exemplary Embodiment 2 of the present disclosure.

FIG. 9 is an explanatory diagram illustrating a circuit configuration of a temperature detection device 50 according to a modified example of Exemplary Embodiment 2 of the present disclosure. Note that basic configuration of the present embodiment is similar to that of Exemplary Embodiment 1; thus, common portions are denoted by the same reference signs and description thereof is omitted.

As illustrated in FIG. 9, in the temperature detection device 50 according to the present embodiment, similarly to Exemplary Embodiment 1, a plurality of the temperature detection elements 15(R), 15(G), and 15(B) are provided correspondingly to each of the electro-optical panels 100(R), 100(G), and 100(B) of the plurality of the electro-optical devices 1(R), 1(G), and 1(B). In addition, the temperature signal generation unit 75, the temperature control unit 79, the outside diagnostic instruction input unit 78, and the diagnostic result display unit 77 are common to the three electro-optical panels 100(R), 100(G), and 100(B). In the present embodiment, similarly to the modified example of Exemplary Embodiment 1, the constant current circuit 55 supplies the driving current If to each of the plurality of the temperature detection elements 15 via the temperature detection circuits 51. Therefore, since the number of the constant current circuit 55 is less than the number of the temperature detection elements 15, advantages such as ability to simplify circuit configuration are obtained.

In the present embodiment, similarly to Exemplary Embodiment 2, the driving current monitoring circuit 52 is provided correspondingly to any one of the plurality of the temperature detection elements 15. In addition, a plurality of the driving current monitoring circuits 52 are provided correspondingly to any one of the plurality of the temperature detection elements 15, and the constant current circuit 55 supplies the driving current If to each of a plurality of the current-voltage conversion units 54 of the driving current monitoring circuits 52. In the present embodiment, a driving current monitoring circuit 52(R) is provided, as a first driving current monitoring circuit 521(R) and a second driving current monitoring circuit 522(R), correspondingly to the temperature detection element 15(R) from among the plurality of temperature detection elements 15(R), 15(G), and 15(B). The constant current circuit 55 sequentially supplies the driving current If to each of a first current-voltage conversion unit 541(R) of the first driving current monitoring circuit 521(R) and a second current-voltage conversion unit 542(R) of the second driving current monitoring circuit 522(R). In addition, a voltage Vg1(R) of the first current-voltage conversion unit 541(R) of the first driving current monitoring circuit 521(R) and a voltage Vg2(R) of the second current-voltage conversion unit 542(R) of the second driving current monitoring circuit 522(R) are both sequentially outputted to the common temperature signal generation unit 75.

In the present embodiment, in the switching circuit 53, a switch SW1A is provided at a middle position of the wiring running from the constant current circuit 55 to the temperature detection element 15 in the temperature detection circuit 51(R). In addition, in the switching circuit 53, a switch SW1B is provided at a middle position of the wiring running from the constant current circuit 55 to the first current-voltage conversion unit 541 in the first driving current monitoring circuit 521(R), and a switch SW1C is provided at a middle position of the wiring running from the constant current circuit 55 to the second current-voltage conversion unit 542 in the second driving current monitoring circuit 522(R).

Therefore, when observing the voltage Vp(R) of the temperature detection circuit 51, a voltage drop due to the switch SW1A is included; and when observing the voltage Vg1(R) of the first current-voltage conversion unit 541(R), a voltage drop due to the switch SW1B is included. When observing the voltage Vg2(R) of the second current-voltage conversion unit 542(R), a voltage drop due to the switch SW1C is included. However, since the driving current If is extremely small, and the on resistance values of the switches SW1A, SW1B, and SW1C are also sufficiently small, the error imparted to the voltage Vp(R) of the temperature detection circuit 51, the voltage Vg1(R) of the first current-voltage conversion unit 541(R), and the voltage Vg2(R) of the second current-voltage conversion unit 542(R) can be made small.

Accordingly, when detecting temperature, the central control unit 72 outputs a command signal for turning on the switch SW1A corresponding to the electro-optical panel 100(R) and turning off the other switches to the switching circuit 53. As a result, the driving current If is applied from the constant current circuit 55 to the temperature detection element 15(R) for a certain period of time, during which time the voltage Vp(R) of the temperature detection element 15(R) is inputted to the central control unit 72 via the voltage detection unit 71. Consequently, the central control unit 72 can detect, based on the monitoring result at the temperature detection circuit 51(R), the temperature of the electro-optical panel 100(R). In addition, after detection of the temperature of the electro-optical panel 100(R), detection of the temperature of the electro-optical panel 100(G) and detection of the temperature of the electro-optical panel 100(B) can be sequentially performed.

In addition, when monitoring the driving current, the central control unit 72 outputs a command signal for turning on the switch SW1B and turning off the other switches to the switching circuit 53. As a result, application of the driving current If from the constant current circuit 55 to the temperature detection element 15(R) is stopped, and the driving current If is applied to the first current-voltage conversion unit 541(R) of the first driving current monitoring circuit 521(R) for a certain period of time. During that time, application of the driving current If to the second current-voltage conversion unit 542(R) of the second driving current monitoring circuit 522(R) is stopped. Accordingly, the voltage Vg1(R) of the first current-voltage conversion unit 541(R) is inputted to the central control unit 72 via the voltage detection unit 71.

Next, the central control unit 72 outputs a command signal for turning on the switch SW1C and turning off the other switches to the switching circuit 53. As a result, with application of the driving current If from the constant current circuit 55 to the temperature detection element 15(R) kept being stopped, the driving current If is applied to the second current-voltage conversion unit 542(R) of the second driving current monitoring circuit 522(R) for a certain period of time. During that time, application of the driving current If to the first current-voltage conversion unit 541(R) of the first driving current monitoring circuit 521(R) is stopped. Accordingly, the voltage Vg2(R) of the second current-voltage conversion unit 542(R) is inputted to the central control unit 72 via the voltage detection unit 71.

Therefore, the central control unit 72 can calculate, based on the voltage Vg1(R) of the first current-voltage conversion unit 541(R) and the voltage Vg2(R) of the second current-voltage conversion unit 542(R), the amount of change in the driving current If from a preset current value.

In the present embodiment, the first current-voltage conversion unit 541 and the second current-voltage conversion unit 542 may either be fixed resistors having the same resistance value or fixed resistors having different resistance values. Here, the first current-voltage conversion unit 541 and the second current-voltage conversion unit 542 may have different resistance values. For example, the first current-voltage conversion unit 541 has a resistance value of 5 MΩ, while the second current-voltage conversion unit 542 has a resistance value of 6.5 MΩ. Therefore, assuming that the driving current If is 0.5 μA, an output of 2.5 V can be obtained from the first current-voltage conversion unit 541, while an output of 3.25 V can be obtained from the second current-voltage conversion unit 542. A voltage of 2.5 V is the operation point voltage when the temperature detection element 15(R) is about 75° C. A voltage of 3.25 V is the operation point voltage when the temperature detection element 15(R) is about 0° C. According to such configuration, in addition to the amount of change in the driving current If, stability of constant current characteristics when the temperature detection element 15(R) is placed in a range from about 0° C. to about 75° C. can be monitored. Therefore, not only when the driving current If greatly changes but also when stability of constant current characteristics deteriorates, such events can be detected as failure of the constant current circuit 55, and repair and the like including replacing components of the constant current circuit 55 can be performed.

Exemplary Embodiment 3

Figure 10:
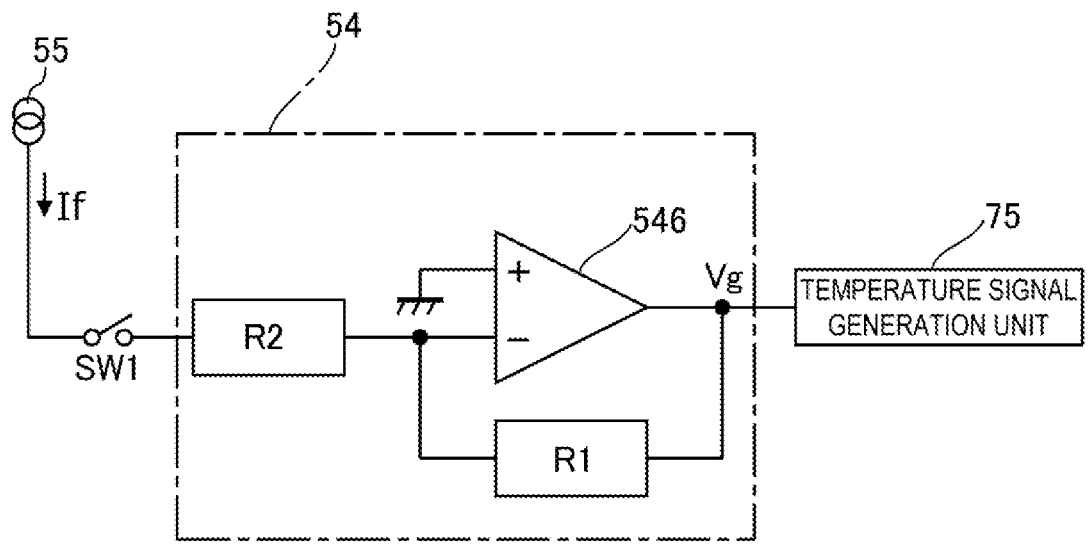
FIG. 10 is an explanatory diagram of a temperature detection device according to Exemplary Embodiment 3 of the present disclosure.

FIG. 10 is an explanatory diagram of a temperature detection device 50 according to Exemplary Embodiment 3 of the present disclosure. In Exemplary Embodiments 1 and 2 and a modified example thereof, the current-voltage conversion units 54 are fixed resistors; however, as illustrated in FIG. 10, current-voltage conversion units 54 may be configured to include an op-amp 546. More specifically, a non-inversion input terminal (+) of the op-amp 546 is electrically connected to ground, and a feedback resistor R1 is electrically connected between an inversion input terminal (−) of the op-amp 546 and the output terminal. Here, since the non-inversion input terminal (+) and the inversion input terminal (−) have the same potential, a voltage Vg equivalent to −If×R1 is outputted from the op-amp 546 to the temperature signal generation unit 75. In addition, making the feedback resistor R1 greater allows its sensitivity corresponding to change in current to be enhanced. For example, when a 10% change in the driving current If is to be outputted as a difference exceeding 20 mV, the feedback resistor R1 is designed such that the following condition is satisfied.

$$If \times 0.1 \times R1 > 20 \; [\text{mV}]$$

Therefore, assuming that the driving current If is 0.5 μA, making the feedback resistor R1 greater than 400 kΩ allows its sensitivity corresponding to change in the driving current If to be made greater than that of the temperature detection element 15. Note that the operation point voltage of the constant current circuit 55 can be set by an input resistor R2. For example, assuming that the driving current If is 0.5 μA, in cases where it is desired to set the operation point voltage to 3 V, an input resistor R2 of 6 MΩ may be used.

In FIG. 10, main points of the configuration from the constant current circuit 55 to the temperature signal generation unit 75 have been extracted and described; however, a case where the configuration is applied to Exemplary Embodiment 1 will be described in detail. Note that description for power supply connecting of the op-amp 546 is omitted. In cases where the current-voltage conversion unit 54 is configured to include the op-amp 546 illustrated in FIG. 10, in Exemplary Embodiment 1 in FIG. 5, for example, the connecting wire between one end of SW1B and one end of SW2B is deleted, and the symbol and connecting wires of the current-voltage conversion unit 54 are replaced with those of a three-terminal configuration. In other words, a first terminal is connected to one end of SW1B, a second terminal is connected to one end of SW2B, and a third terminal is connected to ground. Here, the first terminal is an inversion input terminal (−) of the op-amp 546, the second terminal is an output terminal of the op-amp 546, and the third terminal is a non-inversion input terminal (+) of the op-amp 546.

A case where the configuration is applied to Exemplary Embodiment 2 will be described in detail. Note that description for power supply connecting of the op-amp 546 is omitted. In cases where the current-voltage conversion unit 54 is configured to include the op-amp 546 illustrated in FIG. 10, in Exemplary Embodiment 2 in FIG. 8, the connecting wire between one end of SW1B and one end of SW2B is deleted, and the symbol and connecting wires of the first current-voltage conversion unit 541(R) are replaced with those of a three-terminal configuration. In other words, a first terminal is connected to one end of SW1B, a second terminal is connected to one end of SW2B, and a third terminal is connected to ground. Here, the first terminal is an inversion input terminal (−) of the op-amp 546, the second terminal is an output terminal of the op-amp 546, and the third terminal is a non-inversion input terminal (+) of the op-amp 546. Similarly, the connecting wire between one end of SW1C and one end of SW2C is deleted, and the symbol and connecting wires of the second current-voltage conversion unit 542(R) are replaced with those of a three-terminal configuration. In other words, a first terminal is connected to one end of SW1C, a second terminal is connected to one end of SW2C, and a third terminal is connected to ground. Here, the first terminal is an inversion input terminal (−) of the op-amp 546, the second terminal is an output terminal of the op-amp 546, and the third terminal is a non-inversion input terminal (+) of the op-amp 546.

In cases where the current-voltage conversion unit 54 is configured to include the op-amp 546 illustrated in FIG. 10, the voltage detection unit 71 of Exemplary Embodiment 1 in FIG. 5 and Exemplary Embodiment 2 in FIG. 8 is replaced with the one that supports negative voltage. This can be easily realized since among integrated circuits such as microcomputers in which an A/D converter is installed, for example, there exist those to which a positive voltage and a negative voltage can be inputted as reference voltage.

Exemplary Embodiment 4

Figure 11:
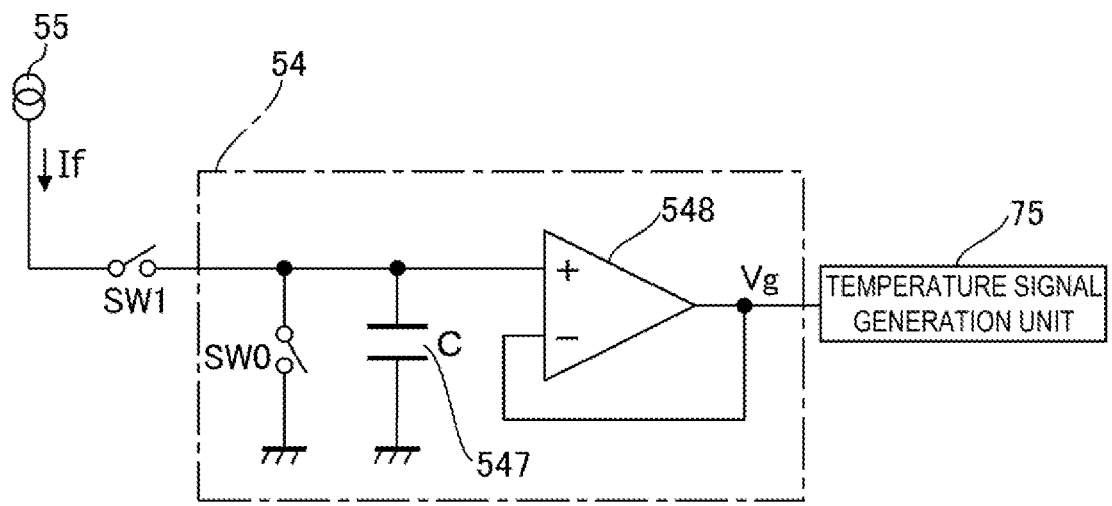
FIG. 11 is an explanatory diagram of a temperature detection device according to Exemplary Embodiment 4 of the present disclosure.

FIG. 11 is an explanatory diagram of a temperature detection device 50 according to Exemplary Embodiment 4 of the present disclosure. As illustrated in FIG. 11, in the present embodiment, the current-voltage conversion unit 54 includes a capacitor 547 having a capacitance C. The voltage Vg after the capacitor 547 has been charged by the driving current If for a certain period of time is outputted to the temperature signal generation unit 75 via a voltage follower 548. In such current-voltage conversion unit 54, after the voltage Vg is initialized to 0 V by turning off a switch SW1 and turning on a switch SW0 by a control signal from the central control unit 72, the switch SW0 is turned off and the switch SW1 is turned on to store the charge from the driving current If in the capacitor 547.

Here, the voltage of the capacitor 547 after a certain period of time t has elapsed is found by Is·t/C. Therefore, at the temperature signal generation unit 75, voltages from the ground level to the voltage equivalent to Is·t/C are monitored. Therefore, comparing the voltage Vg after a certain period of time t has elapsed to a preset value allows change in the driving current If to be detected. In addition, making the time t longer enhances sensitivity corresponding to change in the driving current If.

When a 10% change in the driving current If is to be outputted as a voltage difference exceeding 20 mV, the capacitor 547 is designed such that the following condition is satisfied.

$$If \times 0.1 \times t/C > 20 \; [\text{mV}]$$

Therefore, assuming that the driving current If is 0.5 μA, it is sufficient that t/C is made greater than 400 kV/A.

In FIG. 11, main points of the configuration from the constant current circuit 55 to the temperature signal generation unit 75 have been extracted and described; however, a case where the configuration is applied to Exemplary Embodiment 1 will be described in detail. Note that description for power supply connecting of the op-amp 546 is omitted. In cases where the current-voltage conversion unit 54 is configured to include the op-amp 546 illustrated in FIG. 11, in Exemplary Embodiment 1 in FIG. 5, for example, the connecting wire between one end of SW1B and one end of SW2B is deleted, and the symbol and connecting wires of the current-voltage conversion unit 54 are replaced with those of a three-terminal configuration. In other words, a first terminal is connected to one end of SW1B, a second terminal is connected to one end of SW2B, and a third terminal is connected to ground. Here, the first terminal is a non-inversion input terminal (+) of the op-amp 546, the second terminal is an output terminal of the op-amp 546, and the third terminal is a terminal to which one end of the capacitor 547 and one end of the switch SW0 are connected.

A case where the configuration is applied to Exemplary Embodiment 2 will be described in detail. Note that description for power supply connecting of the op-amp 546 is omitted. In cases where the current-voltage conversion unit 54 is configured to include the op-amp 546 illustrated in FIG. 11, in Exemplary Embodiment 2 in FIG. 8, the connecting wire between one end of SW1B and one end of SW2B is deleted, and the symbol and connecting wires of the first current-voltage conversion unit 541(R) are replaced with those of a three-terminal configuration. In other words, a first terminal is connected to one end of SW1B, a second terminal is connected to one end of SW2B, and a third terminal is connected to ground. Here, the first terminal is a non-inversion input terminal (+) of the op-amp 546, the second terminal is an output terminal of the op-amp 546, and the third terminal is a terminal to which one end of the capacitor 547 and one end of the switch SW0 are connected. Similarly, the connecting wire between one end of SW1C and one end of SW2C is deleted, and the symbol and connecting wires of the second current-voltage conversion unit 542(R) are replaced with those of a three-terminal configuration. In other words, a first terminal is connected to one end of SW1C, a second terminal is connected to one end of SW2C, and a third terminal is connected to ground. Here, the first terminal is a non-inversion input terminal (+) of the op-amp 546, the second terminal is an output terminal of the op-amp 546, and the third terminal is a terminal to which one end of the capacitor 547 and one end of the switch SW0 are connected.

Other Exemplary Embodiments

In the above-described exemplary embodiments, a plurality of the temperature detection elements 15 are provided in the temperature detection device 50; however, the present disclosure may be applied to cases where one temperature detection element 15 is provided. For example, the present disclosure may be applied to cases where the temperature detection element 15 is provided in any one electro-optical panel 100 of the plurality of the electro-optical panels 100. In addition, the present disclosure may be applied to cases where one electro-optical panel 100 is provided in the electronic apparatus 2100.

In addition, for example, Exemplary Embodiment 1 is an aspect in which temperature detection and monitoring of the driving current are alternately repeated; however, the present disclosure is not limited thereto. The frequency of temperature detection and the frequency of monitoring of the driving current may be different. Monitoring of the driving current may be carried out, for example, once at the time of power ON operation or at the time of power OFF operation of the electronic apparatus 2100. Alternatively, monitoring of the driving current may be executed by the outside diagnostic instruction input unit 78 constituted by a control button provided in the electronic apparatus 2100.

In addition, in Exemplary Embodiment 2 illustrated in FIG. 8, the switch SW1C and the second current-voltage conversion unit 542(R) may be deleted, and the second current-voltage conversion unit 542(R) may be replaced with a variable resistor element (also known as digital volume) controlled by the central control unit 72. In this way, behavior of the constant current circuit 55 at a plurality of operation point voltages can be monitored by the variable resistor element. Specifically, at the time of monitoring of a first driving current, the switch SW1B and the switch SW2B are turned on and the other switches are turned off by the central control unit 72. At that time, the central control unit 72 sets the variable resistor element of the second current-voltage conversion unit 542(R) as a first resistor and executes monitoring of the driving current. Similarly, at the time of monitoring of a second driving current, the central control unit 72 sets the variable resistor element as a second resistor having a resistance value different from that of the first resistor and executes monitoring of the driving current. Such monitoring of the first driving current and such monitoring of the second driving current can be combined to investigate into behavior of the constant current circuit 55.

In the above-described exemplary embodiments, the electro-optical device 1 is a transmission-type liquid crystal device. However, the present disclosure may be applied to cases where the electro-optical device 1 is a reflection-type liquid crystal device and cases where the electro-optical device 1 is an organic electroluminescent device. In addition, for pixels, a display element (microelectromechanical systems (MEMS) device) such as a digital micromirror device (DMD) may be employed.

Other Electronic Apparatuses

Electronic apparatuses including the electro-optical device 1 to which the present disclosure is applied are not limited to the electronic apparatus 2100 of the above-described exemplary embodiments. For example, the present disclosure may be used for electronic apparatuses such as a projection-type head up display (HUD), a direct-view-type head mounted display (HMD), a personal computer, a digital still camera, and a liquid crystal television.

What is claimed is:

1. A temperature detection device comprising:
   a temperature detection element;
   a constant current circuit configured to supply a driving current to the temperature detection element;
   a voltage detection unit configured to detect a voltage of the temperature detection element when the driving current is supplied to the temperature detection element; and
   a driving current monitoring circuit electrically connected to the constant current circuit.

2. The temperature detection device according to claim 1, wherein
   the temperature detection element is a diode.

3. The temperature detection device according to claim 1, wherein
   the driving current monitoring circuit includes a current-voltage conversion unit, output voltage of which changes corresponding to a change in the driving current, the driving current monitoring circuit outputting a voltage when the driving current is supplied to the current-voltage conversion unit.

4. The temperature detection device according to claim 3, wherein
an amount of change in the output voltage of the current-voltage conversion unit corresponding to a change in the driving current is greater than an amount of change in an output voltage of the temperature detection element corresponding to the change in the driving current.

5. The temperature detection device according to claim 4, wherein
the current-voltage conversion unit is a resistor element.

6. The temperature detection device according to claim 3, comprising:
a switching circuit configured to switch a current path between a state in which the driving current is supplied from the constant current circuit to the temperature detection element and a state in which the driving current is supplied from the constant current circuit to the current-voltage conversion unit.

7. The temperature detection device according to claim 1, comprising:
a correction unit configured to perform correction of an output voltage of the temperature detection element based on a monitoring result of the driving current by the driving current monitoring circuit.

8. The temperature detection device according to claim 1, comprising:
an alert circuit configured to report an abnormality based on a monitoring result of the driving current by the driving current monitoring circuit.

9. The temperature detection device according to claim 1, comprising:
a plurality of the temperature detection elements, wherein
the constant current circuit and the driving current monitoring circuit are provided correspondingly to each of the plurality of the temperature detection elements.

10. The temperature detection device according to claim 1, comprising:
a plurality of the temperature detection elements, wherein
the constant current circuit outputs the driving current to each of the plurality of the temperature detection elements and
the driving current monitoring circuit is provided correspondingly to each of the plurality of the temperature detection elements.

11. The temperature detection device according to claim 1, comprising:
a plurality of the temperature detection elements, wherein
the constant current circuit outputs the driving current to each of the plurality of the temperature detection elements and
the driving current monitoring circuit is provided correspondingly to any of the plurality of the temperature detection elements.

12. The temperature detection device according to claim 1, wherein
a plurality of the driving current monitoring circuits are provided correspondingly to the temperature detection element.

13. An electronic apparatus comprising the temperature detection device according to claim 1, comprising:
an electro-optical device including an electro-optical panel temperature of which is detected via the temperature detection element.

14. The electronic apparatus according to claim 13, wherein
the electro-optical panel includes a first substrate having a plurality of pixel electrodes provided in a display region and
the temperature detection element is provided outside of the display region of the first substrate.

15. The electronic apparatus according to claim 14, wherein
the electro-optical panel includes a second substrate facing the first substrate and an electro-optical layer disposed between the first substrate and the second substrate.

16. The electronic apparatus according to claim 13, wherein
the electro-optical device includes a temperature adjustment device configured to adjust a temperature of the electro-optical panel and
the temperature adjustment device is configured to perform at least one of heating and cooling of the electro-optical panel based on a detection result of the voltage detection unit.

* * * * *